US012209844B2

(12) United States Patent
Argyle et al.

(10) Patent No.: US 12,209,844 B2
(45) Date of Patent: Jan. 28, 2025

(54) SYSTEM AND METHOD OF MANAGING A PLURALITY OF PROJECTILE MODULES ON A FLYING DEVICE

(71) Applicant: Fortem Technologies, Inc., Pleasant Grove, UT (US)

(72) Inventors: Matthew Elliott Argyle, Lindon, UT (US); Eric Christopher Townsend, Riverton, UT (US); Norman Fong, South Jordan, UT (US)

(73) Assignee: Fortem Technologies, Inc., Pleasant Grove, UT (US)

( * ) Notice: Subject to any disclaimer, the term of this patent is extended or adjusted under 35 U.S.C. 154(b) by 820 days.

(21) Appl. No.: 17/316,493

(22) Filed: May 10, 2021

(65) Prior Publication Data

US 2022/0049932 A1     Feb. 17, 2022

Related U.S. Application Data

(63) Continuation-in-part of application No. 17/113,655, filed on Dec. 7, 2020, now Pat. No. 11,747,113, and (Continued)

(51) Int. Cl.
  *F41H 13/00*     (2006.01)
  *B64C 9/02*      (2006.01)
  (Continued)

(52) U.S. Cl.
  CPC ......... *F41H 13/0006* (2013.01); *F41G 3/22* (2013.01); *F41G 9/002* (2013.01); *B64U 2101/15* (2023.01)

(58) Field of Classification Search
  CPC ...... F41H 11/00; F41H 13/0006; F41H 11/02; F41H 13/0025; F41H 13/0043;
  (Continued)

(56) References Cited

U.S. PATENT DOCUMENTS 4,234,142 A     11/1980   Yost
5,036,466 A *    7/1991   Fitzgerald ............... F41G 7/007
                                                    714/E11.016

(Continued)

FOREIGN PATENT DOCUMENTS

EP     0527715 A1     2/1993
GB     2296078 A  *   6/1996     ............. F41G 7/224

OTHER PUBLICATIONS

"Pogo Pin Catalog", no author listed, no date listed, retrieved from www.pogo-pins.com on Nov. 14, 2022, Cnomax Technology Co., Limited (HK); Hong Kong, Hong Kong Special Administrative Region, China. (Year: 2022).

(Continued)

*Primary Examiner* — Bernarr E Gregory

(57) ABSTRACT

A flying vehicle is disclosed with a plurality of projectile systems that each contains a projectile for projecting at another flying device. The flying vehicle can include a control system, a flight system in communication with the control system for enabling the flying vehicle to fly, a first projectile system in communication with the control system and a second projectile system in communication with the control system. The control system determines, based on a characteristic of a target flying vehicle, whether to implement a first mode utilizing the first projectile system or a second mode utilizing the second projectile system to capture the target flying vehicle.

22 Claims, 13 Drawing Sheets

Related U.S. Application Data a continuation-in-part of application No. 16/914,640, filed on Jun. 29, 2020, now Pat. No. 11,001,381, which is a continuation of application No. 16/176,688, filed on Oct. 31, 2018, now Pat. No. 10,696,402, said application No. 17/113,655 is a continuation of application No. 16/176,881, filed on Oct. 31, 2018, now Pat. No. 10,859,346.

(51) Int. Cl.
*F41G 3/22* (2006.01)
*F41G 9/00* (2006.01)
*B64U 101/15* (2023.01)

(58) Field of Classification Search
CPC ... F42B 39/26; F41G 3/04; F41G 9/00; F41G 3/22; F41G 9/002; F41G 3/08; F41G 7/224; F41G 7/007; B64C 39/024; B64U 2101/15; B41B 11/62; B41B 11/723; F41B 11/62; B64D 1/04
See application file for complete search history.

(56) References Cited

U.S. PATENT DOCUMENTS

| | | | |
|---|---|---|---|
| 5,102,065 A | 4/1992 | Couderc | |
| 5,153,366 A * | 10/1992 | Lucas | F41G 9/00 89/1.11 |
| 5,228,854 A | 7/1993 | Eldrigde | |
| 5,379,966 A | 1/1995 | Simeone | |
| 5,436,832 A | 7/1995 | Bessacini et al. | |
| 5,436,966 A | 7/1995 | Barrett | |
| 5,503,137 A | 4/1996 | Fusco | |
| 5,637,826 A | 6/1997 | Bessacini | |
| 5,831,199 A | 11/1998 | McNulty, Jr. | |
| 5,898,125 A | 4/1999 | Mangolds | |
| 5,992,288 A * | 11/1999 | Barnes | F41G 3/04 700/28 |
| 6,120,337 A | 9/2000 | Bautista | |
| 6,497,169 B1 * | 12/2002 | Khosla | F41H 11/02 702/144 |
| 6,626,077 B1 | 9/2003 | Gilbert | |
| 6,643,972 B2 | 11/2003 | Prokaski | |
| 6,796,213 B1 | 9/2004 | McKendree | |
| 6,854,374 B1 | 2/2005 | Breazeale | |
| 8,146,193 B1 | 4/2012 | Franzino | |
| 8,176,834 B1 | 5/2012 | Arevalo | |
| 8,267,000 B1 | 9/2012 | Larson | |
| 8,544,375 B2 * | 10/2013 | Kravitz | F41H 11/02 89/1.11 |
| 8,669,505 B2 | 3/2014 | Guibout | |
| 8,710,411 B1 | 4/2014 | LaPat | |
| 8,991,793 B1 | 3/2015 | Bernhardt | |
| 9,134,099 B2 | 9/2015 | Tseng | |
| 9,435,619 B1 | 9/2016 | Park | |
| 9,581,417 B2 | 2/2017 | Tseng | |
| 9,658,034 B2 * | 5/2017 | Leboucher | F41H 11/00 |
| 9,989,336 B2 | 6/2018 | Purvis | |
| 10,036,615 B2 | 7/2018 | Norris | |
| 10,107,599 B2 | 10/2018 | Norris | |
| 10,113,839 B2 | 10/2018 | Sekiya | |
| 10,197,365 B1 | 2/2019 | Blyskal | |
| 10,399,674 B2 | 9/2019 | Goodrich | |
| 10,401,129 B2 | 9/2019 | Armstrong | |
| 10,435,153 B2 | 10/2019 | Klein | |
| 10,634,461 B2 | 4/2020 | Norris | |
| 10,689,112 B2 | 6/2020 | Naito | |
| 10,852,114 B2 | 12/2020 | Norris | |
| 10,859,346 B2 | 12/2020 | Townsend | |
| 10,926,875 B2 | 2/2021 | Klein | |
| 2002/0134365 A1 | 9/2002 | Gray | |
| 2003/0150961 A1 | 8/2003 | Boelitz | |
| 2006/0187610 A1 | 8/2006 | Su | |
| 2006/0207466 A1 | 9/2006 | McNulty | |
| 2006/0225333 A1 | 10/2006 | Park | |
| 2007/0019358 A1 | 1/2007 | Kroll | |
| 2007/0012270 A1 | 5/2007 | Swensen | |
| 2010/0089226 A1 * | 4/2010 | Jones | F42B 39/26 89/1.1 |
| 2010/0132580 A1 | 6/2010 | Nazdratenko | |
| 2010/0314487 A1 | 12/2010 | Boelitz | |
| 2010/0315755 A1 | 12/2010 | Gavin | |
| 2011/0011347 A1 | 1/2011 | Ohlman | |
| 2011/0102964 A1 | 5/2011 | Bass | |
| 2011/0220087 A1 | 9/2011 | Gerwig | |
| 2011/0303613 A1 | 12/2011 | Crouse | |
| 2012/0170167 A1 | 7/2012 | Beechey | |
| 2013/0239937 A1 | 9/2013 | Macri | |
| 2014/0045146 A1 | 2/2014 | Otte | |
| 2014/0331984 A1 | 11/2014 | Brahler, II | |
| 2015/0002981 A1 | 1/2015 | Klug | |
| 2015/0168107 A1 | 6/2015 | Tseng | |
| 2016/0010956 A1 | 1/2016 | Hanchett | |
| 2016/0161225 A1 | 6/2016 | Searle | |
| 2016/0251088 A1 | 9/2016 | Melish | |
| 2016/0293015 A1 | 10/2016 | Bragin | |
| 2016/0376029 A1 | 12/2016 | Sekiya | |
| 2017/0144756 A1 | 5/2017 | Rastgaar Aagaah | |
| 2017/0225784 A1 | 8/2017 | Hayes | |
| 2017/0261292 A1 | 9/2017 | Armstrong | |
| 2017/0276460 A1 | 9/2017 | Norris | |
| 2017/0355461 A1 | 12/2017 | Naito | |
| 2017/0356726 A1 | 12/2017 | Theiss | |
| 2018/0094908 A1 | 4/2018 | Down | |
| 2018/0162530 A1 | 6/2018 | Klein | |
| 2018/0335779 A1 | 11/2018 | Fisher | |
| 2018/0353316 A1 | 12/2018 | Anderson | |
| 2019/0063881 A1 | 2/2019 | Abramov | |
| 2019/0068953 A1 | 2/2019 | Choi | |
| 2019/0088156 A1 | 3/2019 | Choi | |
| 2019/0112045 A1 | 4/2019 | Zhang | |
| 2019/0129427 A1 | 5/2019 | Sugaki | |

OTHER PUBLICATIONS

Born, A., "What are Pogo Pins (Spring-loaded pins)?"; Jun. 28, 2022; posted on the Internet at connectorsupplier.com. (Year: 2022).

PCT/US19/58443, Outgoing Written Opinion of the ISA, Jan. 16, 2020 (Year: 2020).

PCT/US19/58443, Outgoing ISA 210 International Search Report, Jan. 16, 2020 (Year: 2020).

\* cited by examiner

SYSTEM AND METHOD OF MANAGING A PLURALITY OF PROJECTILE MODULES ON A FLYING DEVICE

PRIORITY CLAIM

The present application is a continuation-in-part application that claims priority to application Ser. No. 17/113,655, filed on Dec. 7, 2020, now U.S. Pat. No. 11,747,113, which application is a continuation of application Ser. No. 16/176,881, filed on Oct. 31, 2018, now U.S. Pat. No. 10,859,346, issued Dec. 8, 2020, the contents of which are incorporated herein by reference.

The present application is a continuation-in-part application that claims priority to application Ser. No. 16/914,640, filed on Jun. 29, 2020, now U.S. Pat. No. 11,001,381, which application is a continuation of application Ser. No. 16/176,688, filed on Oct. 31, 2018, now U.S. Pat. No. 10,696,402, issued Jun. 30, 2020, the contents of which are incorporated herein by reference.

RELATED APPLICATIONS

The present application is related to application Ser. No. 17/316,364, filed on May 10, 2021, now U.S. Pat. No. 11,597,517, and application Ser. No. 17/316,433, filed on May 10, 2021, now U.S. Pat. No. 11,498,679, the contents of which are incorporated herein by reference.

TECHNICAL FIELD

The present disclosure relates to a targeting and projectile deployment system used on a flying device to immobilize other flying devices. The system determines a proper mode and selects from a plurality of projectile modules a projectile module that will be used to hit a target device.

BACKGROUND

Although drone technology has been around for half a century, high production costs and older technology limited owners of large and bulky drones to include mostly that of military or special interest groups. Advancements in drone technology reduced the price and size of drones, eventually making them more readily available to individual consumers. With an increase in consumer drones, problems began to surface regarding privacy, trespassing and security issues.

As drones are able to fly at high altitudes, it is extremely difficult to remove an unwanted drone from a designated property. Also, many drones are able to carry a payload, which raises security issues concerning hostile applications such as carrying and deploying an explosive or harmful chemical agent. Not being able to remove or eliminate potentially threatening drones can be a major problem for governments, event planners, or any land owner.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

Figure 1:
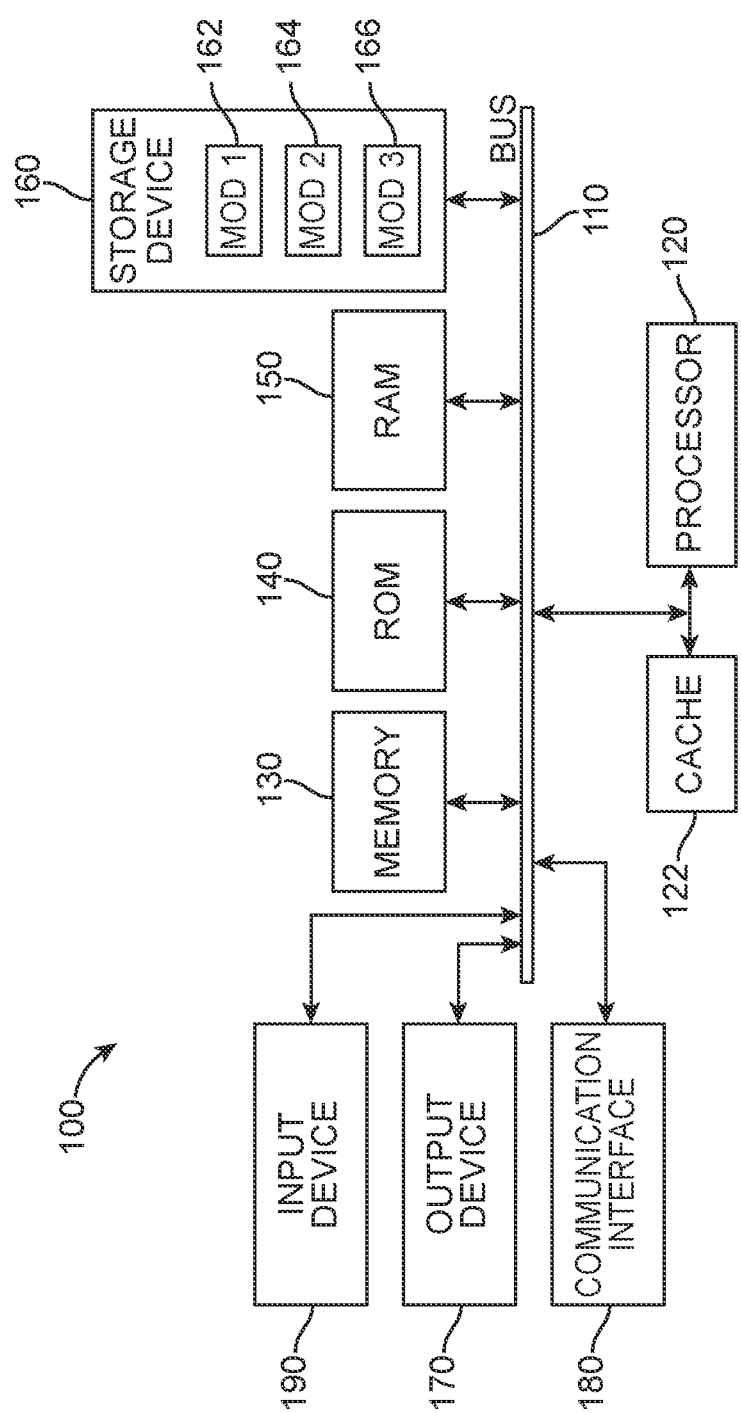
FIG. 1 illustrates an example system configuration.

DESCRIPTION OF EXAMPLE EMBODIMENTS
BRIEF INTRODUCTION

Disclosed are a flying vehicle, system and method associated with managing a projectile deployment component. The present disclosure introduces a number of technologies associated with the projectile module configured on a flying vehicle, such as a drone. The technologies improve the reliability and the repeatability of utilizing a projectile from a drone to capture or immobilize another dangerous drone. Some of the improvements described herein represent innovations necessary to achieve reliable and repeatable operation over typical commercial guns.

For example, when the projectile is a net, the net size, gas pressure, and release mechanisms of typical off-the-shelf net guns were not satisfactory for a drone application. Features that are described herein that represent improvements include a configuration and O-ring design associated with weights attached to corners of a net, an approach to wrapping the net and preparing the net for the projectile module, the string material, replaceable head cartridges, a gun configuration and other approaches to net optimization for capturing drones, and so forth. These various improvements will be addressed in this disclosure and any combination of individual features can be combined and claimed in various embodiments.

In another aspect, this disclosure includes concepts related to the use of multiple different types of projectile systems configured on a flying vehicle. A first projectile net can have certain physical characteristics and a second projectile net may have different characteristics. Other weapons such as lasers, bullets, radar or signal jammers, can also be included in the arsenal available to use. A control system can take into account such data and evaluate a target device (or multiple target devices), and determine a mode or select a projectile system having a threshold probability of success given its characteristics and then carry out an attack plan. Multiple target devices might also need to be addressed and the flying vehicle can evaluate probabilities of capturing multiple target devices given its arsenal of weapons and can determine in a coordinated way what a multi-vector attack plan should be.

Several disclosed ideas are summarized next. First, some general ideas are presented and then the use of multiple projectile modules and how to select one or more projectiles (or other weapons) for carrying out an attack plan on one or more target devices is then discussed. Following the discussion of the general concepts, the more specific scenario of how a control system would evaluate and utilize a multi-weapon arsenal is introduced.

General Concepts

The core concept of using a net as a tool to successfully take down a target flying vehicle is discussed first. As an example of some of the concepts disclosed herein, utilizing the proper size of the net, a proper hole size for a deployment structure to hold the weights, and string material can result in low drag as the net is deployed and expands. One aspect of this disclosure involves a projectile model which models the characteristics of the net as it flies through the air with various environmental conditions such as air density, altitude, wind direction, and so forth. Accordingly, seeking to optimize the physical characteristics of the net is also a factor in how a net model would be developed and used in an analysis of current conditions when determining whether a drone should fire the projectile at a target. Various computer models have been developed to take into account the number of different factors in an analysis to determine whether and when to deploy a projectile to properly capture a drone. The model can also include the necessary maneuvers the attack drone will need to take to properly position itself for net deployment (or any other weapon as well).

A drone having a projectile module can follow a target device and can be constantly modeling what would happen if the projectile were fired at a given time and/or from a given position and potentially at a selected orientation. The modeling predicts the path the projectile, and includes a prediction of the movement in the future of the target device. Using a combination of projective path modeling, and the prediction of the target device path, the system will make timing determinations on when to fire the projectile and at what angle or vector direction. The analysis can include where to position the attack drone as well.

An example method related to determining when to deploy the projectile includes receiving, at a flying vehicle, information associated with a target flying device, wherein the flying vehicle includes a projectile module containing a projectile. The method includes applying a projectile model which generates a probability value that the projectile, if fired from the projectile module, will hit the target flying device, the projectile model taking into account a wind estimate in an area around the flying vehicle based on an inference of wind gained from any means, the wind estimate also considering one or more (1) how the projectile travels through air in which the air has a particular air density, (2) how the projectile travels through the air at a projectile deployment velocity and (3) a drag on the projectile as it travels through the air. When the probability value indicates that the projectile will hit the targeted device according to a threshold, the method includes firing the projectile at the target flying device. The projectile can include one or more of a net, a streamer, a pellet, a bean bag or an explosive. The projectile module can be attached to the flying vehicle in a fixed position or can have an adjustment component that can enable the projectile module to change its orientation relative to the flying vehicle. For example, the gun can be configured on a gimbal which enables controlled movement and pointing of the gun while attached to a drone. The projectile can also represent a different kind of weapon like a jammer, laser or other weapon that does not necessarily project something like a net.

The projectile model further can consider one or more of a flying vehicle position, a flying vehicle pitch, a flying vehicle yaw, a flying vehicle velocity, a target flying device manufactured specification, a target flying device current position, a target flying device velocity, a predicted path of the target flying device, a flying vehicle roll, and a wind velocity. Two, three or four or more of these features can also be included in the evaluation.

The projectile model can also evaluate an orientation of the flying vehicle or based on an orientation of the projectile module. In one aspect, the method can include applying the projectile model to generate a new desired orientation of the flying vehicle. The method can also include adjusting the orientation of the flying vehicle to the new desired orientation of the flying vehicle before firing the projectile from the projectile module. The method also can include reapplying the projectile model after adjusting the orientation of the flying vehicle.

In another aspect or example of the concepts disclosed herein, a method can include receiving, at a flying vehicle, an identification of a target flying device, wherein the flying vehicle includes a projectile module containing a projectile and applying a projectile model which generates a determination which indicates whether, if fired from the projectile module, the projectile will hit the target flying device. The projectile model can take into account a wind estimate in an area around the flying vehicle based on any one or more factors. When the determination indicates that the projectile will hit the targeted device according to a threshold value, the method includes firing the projectile from the projectile module at the targeted flying device.

Another aspect includes a flying vehicle having a processor, a projectile component and a computer-readable storage medium storing instructions which, when executed by the processor, cause the processor to perform operations including receiving an identification of a target flying device and applying a projectile model which generates a determination which indicates whether a projectile, if fired from the projectile component, will hit the target flying device. The projectile model takes into account a wind estimate in an area around the flying vehicle based on an inference of wind from any number of data sources. When the determination indicates that the projectile will hit the targeted device according to a threshold value, firing the projectile at the targeted flying device.

Another example includes the gun component and replaceable head cartridge as a combined system. The system in this regard includes a gun component configured to be removably and electro-mechanically attached to an object (such as a drone) in which the gun component has an attachment arm with a pin at a first end and an engagement flange at a second end. The gun component includes a cylindrical gas valve, a safety component configured on an exterior surface of the cylindrical gas valve, the safety component having an indented surface on a portion of the safety component, the indented surface complimentary to the engagement flange at the second end of the attachment arm, a splitter component configured adjacent to the cylindrical gas valve, the splitter component having an output opening for gas flow, typically through a plurality of openings, and an accumulation reservoir that communicates a gas from the accumulation reservoir to the cylindrical gas valve.

The system includes a removable projectile head cartridge configured with an engagement member for engaging with the attachment arm and the pin. The removable projectile head cartridge can include a channel (open on both ends) that receives a weight at a first end of the channel such that the weight can be positioned for firing at a second end of the channel. A string connects the weight to a projectile contained within the removable projectile head cartridge. Upon attachment of the removable projectile head cartridge to the gun component, a channel opening (or a plurality of channel openings) in the channel aligns with the output opening(s) in the splitter component such that upon firing via an electrical signal from the object, gas is communicated from the accumulation reservoir, to the cylindrical gas valve, to the splitter component, through the output opening in the splitter component and to the channel opening to project the weight out the channel, causing the weight to pull the projectile out of the removable projectile head cartridge.

The safety component further includes a first arm and a second arm each attached to the portion of the safety component and a second portion of the safety component connected to the first arm and the second arm, the second portion having a safety flange positioned to block movement of an attachment component of the gun component in a first position of the safety component and an opening on the second portion for enabling the movement of the attachment component of the gun component in a second position.

The first position can coincide with the removable projectile head cartridge not being locked into engagement with the gun component. In one aspect, the first position coincides with the engagement flange not being aligned with the indented surface on the portion of the safety component. The second position can coincide with the removable projectile head cartridge being locked into engagement with the gun component. The second position can coincide with the engagement flange being aligned with the indented surface of the portion of the safety component.

The gun component further can include a first fixed member for engaging with a first receiving structure of the object and a second moveable member for engaging with a second receiving structure of the object, wherein the second moveable member is enabled to engage with the second receiving structure of the object according to a position of the safety component.

The position of the safety component can be variable as the safety component is rotated around the cylindrical gas valve. The removable projectile head cartridge can have an opening that is one of rectangular shaped, square shaped, or circular shaped. The projectile can include a net having four corners and a respective string can connect each respective corner to a respective weight of four weights.

The removable projectile head cartridge can include four channels, each receiving the respective weight of the four weights. In one aspect, the channel has a rifled configuration, and the weight can include a swivel such that at least a portion of the weight can twist independent of a connection component to which the string is tied.

Another aspect of this disclosure can include claims directed to the removable head cartridge. An example removable projectile head cartridge includes a cup structure having a channel configured in a wall of the cup structure, the channel having a first opening at a lip of the cup structure and a second opening at a base of the cup structure. A weight having a string attached is inserted into the first opening at the lip of the cup structure for movement to the second opening at the base of the cup structure in preparation for firing. The string can also be attached to a projectile held within the cup structure. An engagement member can be configured on an outer surface of the cup structure for engaging with a gun component via an attachment arm with a pin, the attachment arm and pin being configured on the gun component. Upon attachment of the removable projectile head cartridge to the gun component, the second opening at the base of the cup structure aligns with an output opening in a splitter component of the gun component such that upon firing via a signal from an electrical signal from an object to which the gun component is attached, gas is communicated from an accumulation reservoir on the gun component, to an cylindrical gas valve on the gun component, to a splitter component on the gun component, through the output opening in the splitter component and to the second opening at the base of the cup structure to project the weight out the channel, causing the weight to pull the projectile out of the removable projectile head cartridge.

The cup structure can include 2, 3, 4 or more channels, each respective channel receiving a respective weight. The channel can be rifled and the weight in this scenario can include a swivel that causes a portion of the weight to twist independent of a connection component of the weight to which the string is attached. A cover can protect the projectile within the cup structure, wherein the cover breaks upon firing the projectile. The weight can have a first end that is rounded and a second end having a sharp edge. In one aspect, a string attachment component is connected to the second end of the weight. The first end of the weight that is rounded can be inserted into the channel in preparation for firing. The removable projectile head cartridge can be made by a 3D printer or through injection molding.

Multiple Projectile Module Concepts

As noted above, another aspect of this disclosure is the use of multiple projectile modules and how a control system can utilize data about a target device or devices, and chose one or more projectile modules and/or weapons to implement an attack plan with a certain probability of success.

In one example, a flying vehicle can include a control system, a flight system in communication with the control system for enabling the flying vehicle to fly, a first projectile system in communication with the control system and a second projectile system in communication with the control system. The control system determines, based on a characteristic of a target flying vehicle, whether to implement a first mode utilizing the first projectile system or a second mode utilizing the second projectile system to capture the target flying vehicle. An example of the modes can be a defensive mode and an attack mode, with different thresholds, timing requirements, weapon (net) requirements, and so forth. The first projectile system and the second projectile system can include one or more of a net, an electromagnetic signal, a radio frequency signal, a jamming device, a laser, a bullet, and/or a physical projectile. The characteristic of the target flying vehicle can include one or more of a speed of the target flying vehicle, a relative speed of the target flying vehicle to the flying vehicle, a direction of the target flying vehicle, a target flying vehicle classification, a size of the target flying vehicle, a target vehicle flying system, a physical characteristic of the target flying vehicle, how quickly the flying vehicle needs to act, a geographic projected area, a timing on when a shot needs to be taken or when the target flying vehicle needs to be captured, how the target flying vehicle is maneuvering, and an expected path of the target flying vehicle.

The first projectile system can include a first net having a first configuration and the second projectile system can include a second net having a second configuration. The projectile systems may also not include a projectile but can include a radar or RF signal jammer, or a laser, for example. In one aspect, the first configuration differs from the second configuration. The first configuration has first projectile area that is smaller than a second projectile area of the second configuration, which is particularly applicable when the projectiles are nets.

The first mode utilizing the first projectile system further can include a first route to be taken by the flying vehicle in attempting to capture the target flying vehicle. The second mode utilizing the second projectile system further can include a second route to be taken by the flying vehicle in attempting to capture the target flying vehicle. The first route can include following the target flying vehicle and the second route can include moving into a position ahead of the target flying vehicle. The control system further determines, based on one or more of a time period, a geographic boundary relative to the target flying vehicle, an availability of sensor data from sensors not on the flying vehicle, a battery level, a sensor coverage area relative to the target flying vehicle and characteristics of the first projectile system and the second projectile system, whether to implement the first mode utilizing the first projectile system or the second mode utilizing the second projectile system to capture the target flying vehicle. Other modes can be selected as well.

The flying vehicle can further include at least a third projectile system in communication with the control system, wherein the control system determines, based on one or more of a characteristic of the target flying vehicle and data about an available arsenal on the flying vehicle, whether to implement the first mode utilizing the first projectile system, the second mode utilizing the second projectile system, or a third mode utilizing the third projectile system, to capture the target flying vehicle. The first projectile system and the second projectile system are each removably attachable to the flying vehicle in a respective first projectile system receiving port and a second projectile system receiving port.

In another aspect, a flying vehicle can include a control system and a plurality of different projectile systems each removably attached to a respective receiving port of a plurality of projectile system receiving ports. The control system can select, based on one or more of a characteristic of a target flying vehicle and an available arsenal of the plurality of different projectile systems, a selected projectile system from the plurality of different projectile systems to use to capture the target flying vehicle. The control system further can select a pursuit path strategy for the flying vehicle to use the selected projectile system to capture the target flying vehicle or to take some other actions like jamming signals of the target flying vehicle.

In one aspect, the control system identifies a respective probability of a successful capture of the target flying vehicle taking into account alternate characteristics of the different projectile systems. The control system further can select, based on one or more of the characteristic of the target flying vehicle, a probability of a successful capture depending on the plurality of different projectile systems, a battery level, an availability of sensor data from sensors not on the flying vehicle, a geographic boundary, a timing component and respective characteristics of each of the plurality of different projectile systems, a planned route for the flying vehicle to follow to capture the target flying vehicle using a chosen projectile system.

The planned route can be chosen based in part on respective characteristics of the chosen projectile system.

In yet another aspect, a drone can include a control system, a flight system in communication with the control system for enabling the drone to fly, a first projectile system in communication with the control system and a second projectile system in communication with the control system. The control system determines, based on a characteristic of a target drone and one or more of a time frame, a geographic parameter associated with a path of the target drone, an RF coverage area associated with the path of the target drone, a battery level, an availability of sensor data from sensors not on the drone, a timing requirement and a probability of a successful capture of the target drone, whether to implement a first mode associated with a first planned path of the drone to utilize the first projectile system or a second mode associated with a second planned path of the drone to utilize the second projectile system to yield a chosen mode. The drone implements the chosen mode to capture the target drone.

The first projectile system can include a removable first projectile cartridge that attaches to a fixed first projectile cartridge receiving port. The second projectile system can include a removable second projectile cartridge that attaches to a fixed second projectile cartridge receiving port. The flight system can include a set of rotor blades or other structure that enables the flying vehicle to fly.

The control system can receive data from one of another drone or a ground based tracking system to determine the chosen mode. The control system can also receive data from onboard sensors to determine the chosen mode.

This aspect of the disclosure can also include one or more methods of how to determine which projectile system to select for attacking or stopping a target device. A method can include one or more steps including receiving, at a control module of a flying vehicle, data regarding a characteristic of a target flying vehicle, selecting one of a plurality of projectile modules attached to the flying vehicle based on one or more of the characteristic of the target flying vehicle, a timing requirement, a battery level, a geographic boundary, a number of target vehicles, a characteristic of the one of the plurality of projectile modules and a probability of a successful capture using the one of the plurality of projectile modules, to yield a chosen projectile module and causing the chosen projectile module to fire its projectile at the target flying vehicle.

The method can further include, prior to causing the chosen projectile module to fire its projectile, adjusting a flight path of the flying vehicle based on the chosen projectile module. The method can further include determining a probability of the successful capture based on the chosen projectile module or determining a probability of the successful capture of one or more target flying vehicles utilizing the plurality of projectile modules.

In one aspect, a plurality of target flying vehicles are being pursued by the flying vehicle. In this case, the method further includes, based on the probability of the successful capture of the plurality of target flying vehicles, implementing a plan to maneuver and utilize a respective projectile module of the plurality of projectile modules for each target flying vehicle of the plurality of target flying vehicles.

DETAILED DESCRIPTION

The present disclosure relates to a projectile system for configuration on drone and in one example, contains a net that can be deployed for capturing an enemy drone. The net can be prepared and have a respective weight attached to each corner. Each weight can have an O-ring and be configured in a slot such that utilizing air pressure from a canister, and based on a modeling of the projectile and the environment around the enemy drone, a system operating on the drone will determine when to deploy the net to capture the enemy drone. The various details of this system are discussed herein.

As the system disclosed herein requires computing components, a general example computing system shall be disclosed in FIG. 1, which can provide some basic hardware components making up a server, node or other computer system. FIG. 1 illustrates a computing system architecture 100 wherein the components of the system are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different The processor 110 can include any general purpose processor and a hardware module or software module/service, such as service 1 132, service 2 134, and service 3 136 stored in storage device 130, configured to control the processor 110 as well as a special-purpose processor where software instructions are incorporated into the actual processor design. The processor 110 may be a self-contained computing system, for example, containing multiple cores or processors, a bus (connector), memory controller, cache, etc. A multi-core processor may be symmetric or asymmetric.

To enable user interaction with the computing device 100, an input device 145 can represent a variety of input mechanisms, such as a microphone for speech, a touch-sensitive screen for gesture or graphical input, a keyboard and/or mouse, e.g., for motion input and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and/or hybrids thereof.

The storage device 130 can include software services 132, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

It is noted that in one aspect, a computer or computers can be deployed upon a flying vehicle, such as a drone, or as part of a projectile module that is removably attached to a drone in which interfaces with the control system of the drone. The computer or computer devices may also be deployed as a separate control system which can communicate with a drone and/or a projectile module and/or projectile itself. Any wireless protocol is contemplated as being utilized for such communication. The computer or computer devices can be part of a control module or a flight system used to control the flight of a flying vehicle.

Figure 2:
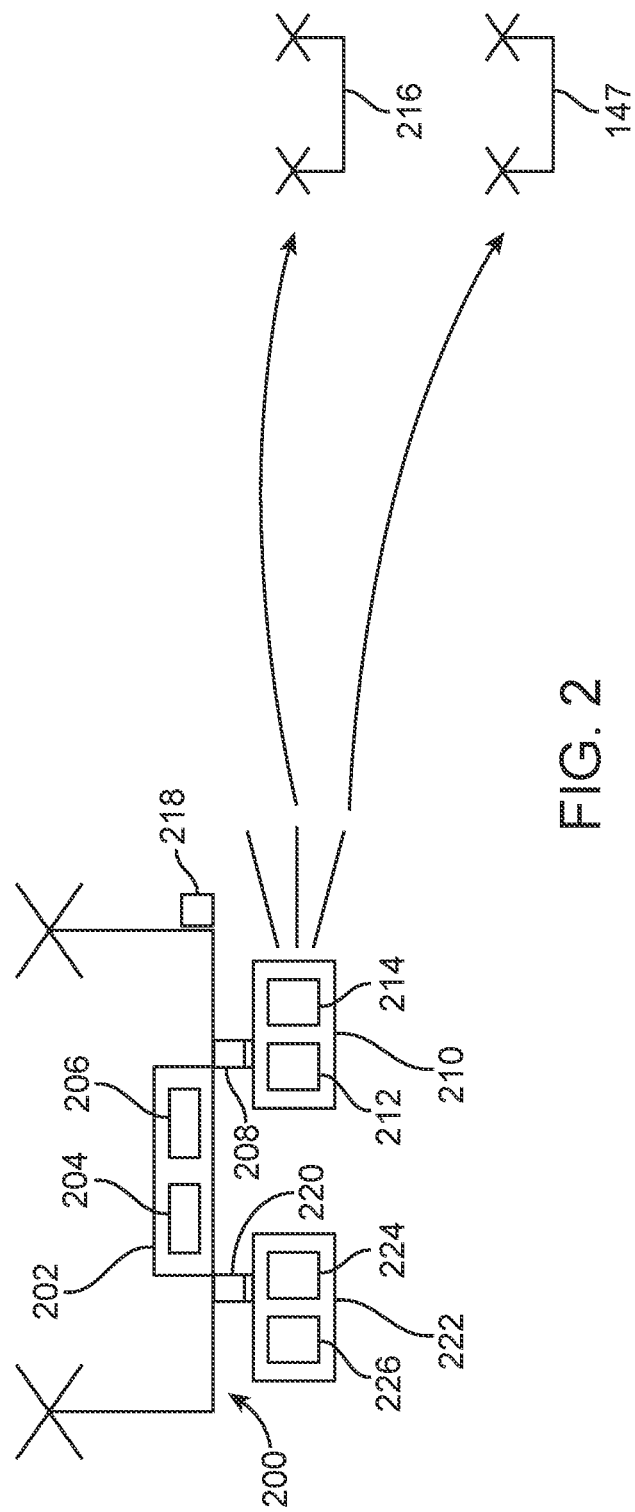
FIG. 2 illustrates an example flying vehicle having a projectile module.

FIG. 2 illustrates the overall system design is disclosed herein. The system includes a flying vehicle 200, such as a drone. The particular configuration of the drone can vary. While the term drone may be used herein, any flying vehicle that has the components disclosed herein, and performs the functions described herein can apply, even if the flying vehicle uses wings, a propeller, rotary blades or other components to fly.

A control system 202 can be included on the flying vehicle 200 to control its operation. Control modules 204, 206 can represent the various functions performed by the control system 202. Feature 206 can include a flight system in communication with the control module 204 and which manages the flight of the flying vehicle 200. Such a system 206 can include the rotary blades, wings, computer code or instructions stored in a computer-readable medium, and/or other mechanisms used to fly the flying vehicle and the control components to enable such flight. Feature 218 can represent a radar or detection system that can identify a target device 216 that the drone 200 desires to engage with. Feature 218 can represent any on-flying vehicle sensor used to track the target device 216. The control system 202 can provide movement instructions, and receive feedback from various components 218 on the flying device 200. The flying device 200 also includes a projectile module 210 which is attached to the flying device 200 via an attachment module 208/220. The projectile module 210 can be snapped into the attachment module 208 in a single connecting motion. For example, spring-loaded arms with steel dowels that can be perpendicular to an access of the launching direction and attached to ends that can be utilized to clamp on or hook the projectile module 210 as it is connected in place. A locking ring can be twisted in place to make sure that connecting arms cannot release the projectile until a ring is unlocked. The entire projectile module 210 can be attached to the drone and quickly detached as well. In one example, the projectile module 210 is held in a pistol grip and a trigger is squeezed to release the device from its amounts. Pogo pins can be used to quickly attach the gun electrically to the mount so that it is at once physically connected. It can also be configured to be electronically commanded to fire as described herein.

In one aspect, the projectile module 210 can include some or all of the computing capability necessary for running an algorithm to determine when to fire a projectile from the module. In one aspect, some computing can occur on the projectile module and some computing can occur on the flying vehicle. Wireless communication can occur between the flying vehicle and the projectile module 210 to communicate firing instructions according to any wireless protocol such as Near Field Communication or Bluetooth. The projectile module 210 can include a battery which can operate the electrical components including the solenoid which can cause the compressed gas to flow and project the projectile from the projectile module.

According to the present disclosure, any number of different mechanisms can be utilized to attach the projectile module 210 to the flying vehicle 200. The projectile module 210 can include a number of components 212, 214. These can represent multiple projectiles that can be contained within the projectile container 210, or they can include a control mechanism, compressed gas, and so forth, which are more fully described herein and which embody the various features of the projectile module.

A second projectile module 222 can be connected 220 to the flying vehicle 200 with its respective components 224, 226. Many of the characteristics described above for projectile module 210 can apply to other projectile modules 222. The type of projectile or the configuration of the projectile in the second projectile module 222 can be similar to the configuration of the projectile module 210 or can be different. For example, the system may include a first type of net as the projectile in projectile module 210 which is configured to capture a certain target device 216 having certain characteristics, such as its size, movement capabilities, physical configuration, and so forth. A second projectile type or a differently configured net could be included in the second projectile module 222 for capturing a different type of target device 216 based on any one or more characteristics of that device. A different net for example can be larger, deploy in a different pattern which causes it to travel more slowly through the air, be heavier, and so forth. Each projectile module 210, 222 can include one projectile as well of similar or differing characteristics. The control system 204 can include algorithms for evaluating data received about the characteristics of the target device 216 and to select a proper chosen projectile module 210, 222 for using its projectile to capture the target device 216. In addition to nets, other weapons such as bullets, lasers, sound, water, chemicals, or any other type of weapon that can be available in an arsenal can apply.

Figure 8:
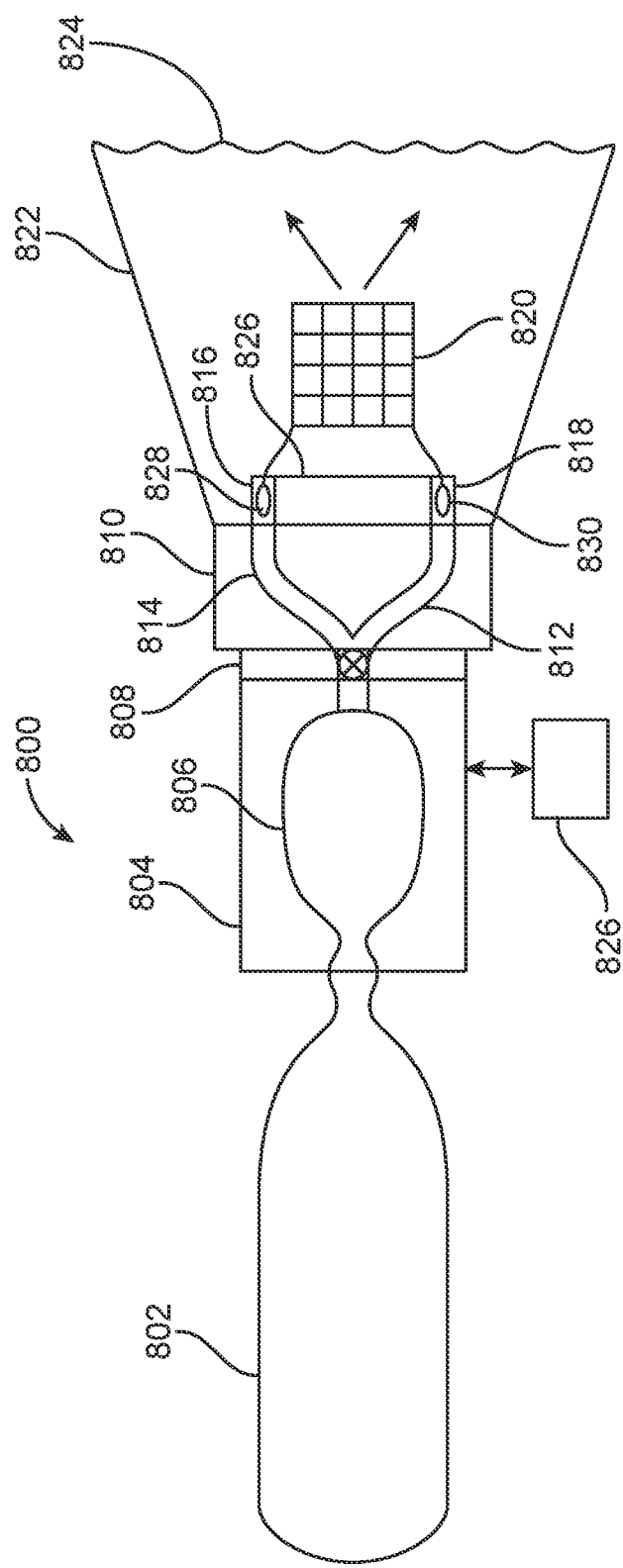
FIG. 8 illustrates the use of a compressed gas in the projectile module.

The flying vehicle or system 200 can also encompass the following features. The flying vehicle can include a computer processor 204 that is part of a computing device or control system 202. The flying vehicle can include a projectile component 210/222 and a computer-readable storage medium storing instructions 204, 206 which, when executed by the processor, cause the processor to perform operations. The system 200 can include electrical communications between the control system 202 and the projectile module 210/222. These can be wired or wireless communications. For example, any wireless protocol such as Bluetooth can be utilized to communicate a triggering command from a control module 202 on the flying vehicle 202 to a projectile module 210/222. The triggering command is sent based on an evaluation model that takes into account the various components and factors described herein to determine when an appropriate time exists to fire the projectile or to choose which weapon to use from the arsenal. The latency associated with firing the projectile has to be low and custom electronics for high-speed electromechanical interactions are useful for reducing the latency between the determination by the computing model to select the right projectile and to fire the projectile and the actual firing the projectile. The triggering command can cause various components to deploy the projectile. FIG. 8 shows some of these components. A solenoid 808 to cause gas to flow from a reservoir 806 through channels 814, 812, into barrels 816, 818, which can cause the weights to travel from the projectile module 822 and at the target device.

The operations can include one or more of receiving an identification of a target flying device, applying a projectile model which generates a determination which indicates whether a projectile, if fired from the projectile component, will hit the target flying device. The projectile model takes into account one or more of a wind estimate in an area around the flying vehicle based on an inference of wind and a projected movement of the target flying device based on the identification of the target flying device. When the determination indicates that the projectile will hit the targeted device according to a threshold value, the system will fire the projectile at the targeted flying device. Such information can also be used when determining what mode to use or which projectile to choose out of a plurality of different projectile modules available in an arsenal.

Next is further discussed the scenario where the control module 204 will select a first projectile module 210 or a second projectile module 222 for capturing the target device 216. In one example the first projectile module 210 may have an attack net with certain physical characteristics (small in size, deployment characteristics, can travel faster and further, etc.) that make it more appropriate for an attack approach to capturing the target device 216. The projectile module 222 may have a defensive net which is larger and slower (or may have other different characteristics such as more drag) as it travels through the air and for which the flying vehicle 200 may need to maneuver into a position in front of the target device 216 to deploy in a defensive manner. In one aspect, the attack net may need to be more focused or more accurate on the shot at the target device 216 while the defensive net may not require the same level of accuracy. Thus, the control module 204 can take into account various factors to determine an accuracy threshold when determining or choosing which projectile module 210/222 to use. If the attack net is used, the flying vehicle 200 can fire the projectile module with the attack net from behind the target device 216. If a defensive net is used, then the flying vehicle 200 may need to maneuver in front of the target device 216 and deploy the defense net in front of the target device 216.

The control system 204 will evaluate the various data to determine a probability of success using a certain weapon. In one aspect, this is performed relative to one target device 216. There is also an approach to performing calculations related to a probability of success when there is a second target device 217 or even more target devices and relative to the various types of available weapons in the arsenal.

In one aspect, the control module 204 can take into account a number of factors such as the type of flying vehicle, its characteristics, characteristics of the flying vehicle, a timing component, a geographic area to be protected, and the characteristics of the different projectiles in the projectile modules 210, 222, and can identify a probability of a successful capture of the target device 216 based on that data. The control modules 204 then chooses the overall mode based on the probability of a capture meeting a threshold. If one projectile module 210 leads to an 80% probability of a capture and selecting the other projectile module 222 leads to an 85% probability of a capture, then the control module 204 selects the higher probability and implements that plan, which can include selected maneuvering of the flying vehicle 200, the selection of the projectile module 210/222, etc., to the deployment of the projectile.

A flying vehicle 200 can include a control system 204, a flight system 206 in communication with the control system for enabling the flying vehicle to fly, a first projectile system 210 in communication with the control system 204 and a second projectile system 222 in communication with the control system 204. The control system 204 determines, based on a characteristic of a target flying vehicle 216 (or multiple target vehicles 216/217), whether to implement a first mode utilizing the first projectile system 210 or a second mode utilizing the second projectile system 222 to capture the target flying vehicle(s) 216/217.

An example of the modes can be a defensive mode and an attack mode, with different thresholds, timing requirements, weapon (net, laser, bullet, etc.) requirements, and so forth. The first projectile system 210 and the second projectile system 222 can include one or more of a net, an electromagnetic signal, a radio frequency signal, a jamming device, a laser, a bullet, and/or a physical projectile. The characteristic of the target flying vehicle(s) 216/217 can include one or more of a speed of the target flying vehicle(s) 216/217, a relative speed of the target flying vehicle(s) 216/217 to the flying vehicle 200, a direction of the target flying vehicle(s) 216/217, a target flying vehicle classification, a size of the target flying vehicle(s) 216/217, a target vehicle flying system, a physical characteristic of the target flying vehicle(s) 216/217, how quickly the flying vehicle needs to act, a geographic projected area, a timing on when a shot needs to be taken or when the target flying vehicle(s) 216/217 needs to be captured, how the target flying vehicle(s) 216/217 is maneuvering, and an expected path of the target flying vehicle(s) 216/217.

The first projectile system 210 can include a first net having a first configuration and the second projectile system 222 can include a second net having a second configuration. The projectile systems may also not include a projectile but can include a radar or RF signal jammer, or a laser, for example. In one aspect, the first configuration differs from the second configuration. The first configuration has first projectile area (such as a net deployment area) that can be smaller than a second projectile area of the second configuration, which is particularly applicable when the projectiles are nets. This could also apply to bullets, a laser beam structure, a jamming signal characteristic and so forth.

The first mode utilizing the first projectile system 210 further can include a first route to be taken by the flying vehicle 200 to capture the target flying vehicle 216. The second mode utilizing the second projectile system 222 further can include a second route to be taken by the flying vehicle 200 to capture the target flying vehicle. Capturing in this sense means either capturing using a net or performing some other task specific to the type of weapon, such as transmitting a jamming signal.

The first route can include following the target flying vehicle 216 and the second route can include moving into a position ahead of the target flying vehicle 216. The control system 204 further determines, based on one or more of a time period, a geographic boundary relative to the target flying vehicle 216, an availability of sensor data from sensors not on the flying vehicle (not shown), a battery level, a sensor coverage area relative to the target flying vehicle 216 and characteristics of the first projectile system 210 and the second projectile system 222, whether to implement the first mode utilizing the first projectile system 210 or the second mode utilizing the second projectile system 222 to capture the target flying vehicle. Other modes can be selected as well.

The flying vehicle 200 can further include at least a third projectile system (not shown) in communication with the control system 204. The control system 204 determines, based on one or more of a characteristic of the target flying vehicle(s) 216/217 and data about an available arsenal on the flying vehicle 200, whether to implement the first mode utilizing the first projectile system 210, the second mode utilizing the second projectile system 222, or a third mode utilizing the third projectile system (not shown), to capture the target flying vehicle(s) 216/217. The first projectile system 210 and the second projectile system 222 are each removably attachable to the flying vehicle 200 in a respective first projectile system receiving port and a second projectile system receiving port.

In another aspect, a flying vehicle 200 can include a control system 204 and a plurality of different projectile systems 210/222 each removably attached to a respective receiving port of a plurality of projectile system receiving ports. The control system 204 can select, based on one or more of a characteristic of a target flying vehicle and an available arsenal of the plurality of different projectile systems 210/222, a selected projectile system from the plurality of different projectile systems 210/222 to use to capture the target flying vehicle(s) 216/217. The control system 204 can implement a computer algorithm to evaluate the data and make a determination of an attack plan. The arsenal can include other weapons attached to the flying vehicle 200 in ways other than are shown for the net projectile. The control system 204 further can select a pursuit path strategy for the flying vehicle 200 to use the selected projectile system to capture the target flying vehicle(s) 216/217 or to take some other actions like jamming signals of the target flying vehicle. A multi-vector approach can included different phases as well such as a first phase of movement and net deploying and a second phase of additional movement and a second net deployment tor a jamming operation.

In one aspect, the control system 204 identifies a respective probability of a successful capture of the target flying vehicle(s) 216/217 taking into account alternate characteristics of the different projectile systems 210/222. The control system 204 further can select, based on one or more of the characteristic of the target flying vehicle(s) 216/217, a probability of a successful capture depending on the plurality of different projectile systems, a battery level, an availability of sensor data from sensors not on the flying vehicle 200, a geographic boundary, a timing component and respective characteristics of each of the plurality of different projectile systems 210/222, a planned route for the flying vehicle 200 to follow to capture (or take some other action related to) the target flying vehicle(s) 216/217 using a chosen projectile system. The planned route of the flying vehicle 200 can be chosen based in part on respective characteristics of the chosen projectile system, such as whether to pursue from behind the target vehicle 216 or to move in front of the target vehicle 216.

In yet another aspect, a drone 200 can include a control system 204, a flight system 206 in communication with the control system for enabling the drone 200 to fly, a first projectile system 210 in communication with the control system 204 and a second projectile system 222 in communication with the control system 204. The control system 204 determines, based on a characteristic of a target drone 216 and one or more of a time frame, a geographic parameter associated with a path of the target drone, an RF coverage area associated with the path of the target drone 216, a battery level, an availability of sensor data from sensors not on the drone 200, a timing requirement and a probability of a successful capture of the target drone 216, whether to implement a first mode associated with a first planned path of the drone 200 to utilize the first projectile system 210 or a second mode associated with a second planned path of the drone 200 to utilize the second projectile system 222 to yield a chosen mode. The drone 200 implements the chosen mode to capture the target drone(s) 216/217.

The first projectile system 210 can include a removable first projectile cartridge that attaches to a fixed first projectile cartridge receiving port. The second projectile system 222 can include a removable second projectile cartridge that attaches to a fixed second projectile cartridge receiving port. Other weapon systems can be attached to the drone 200 in various ways as well as part of the available arsenal. The flight system 206 can include a set of rotor blades or other structure that enables the flying vehicle to fly. The control system 204 can receive data from one of another drone (not shown) or a ground based tracking system (not shown) to determine the chosen mode.

Figure 3A:
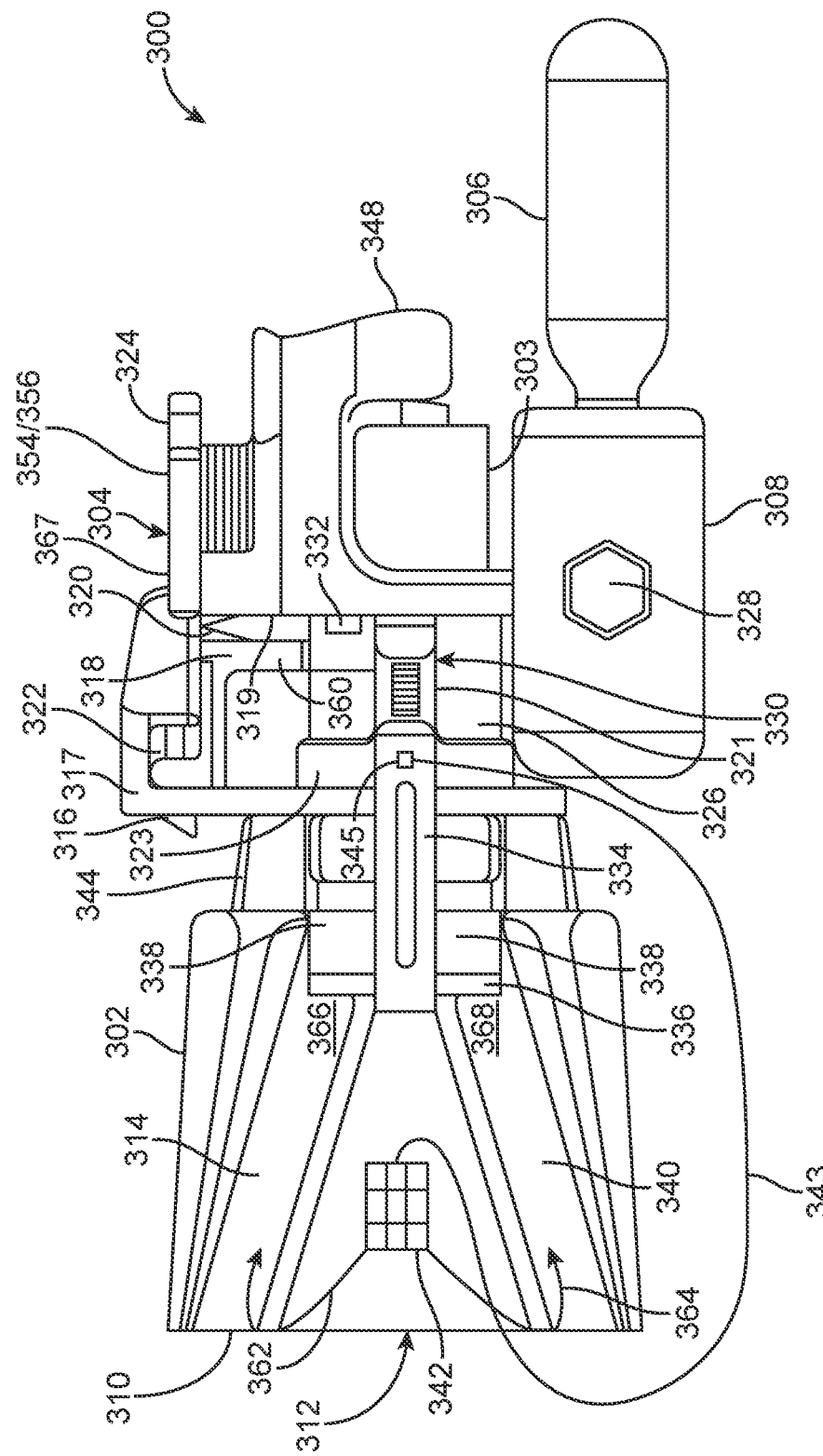
FIG. 3A illustrates an example projectile module attached to a gun base.
Figure 6:
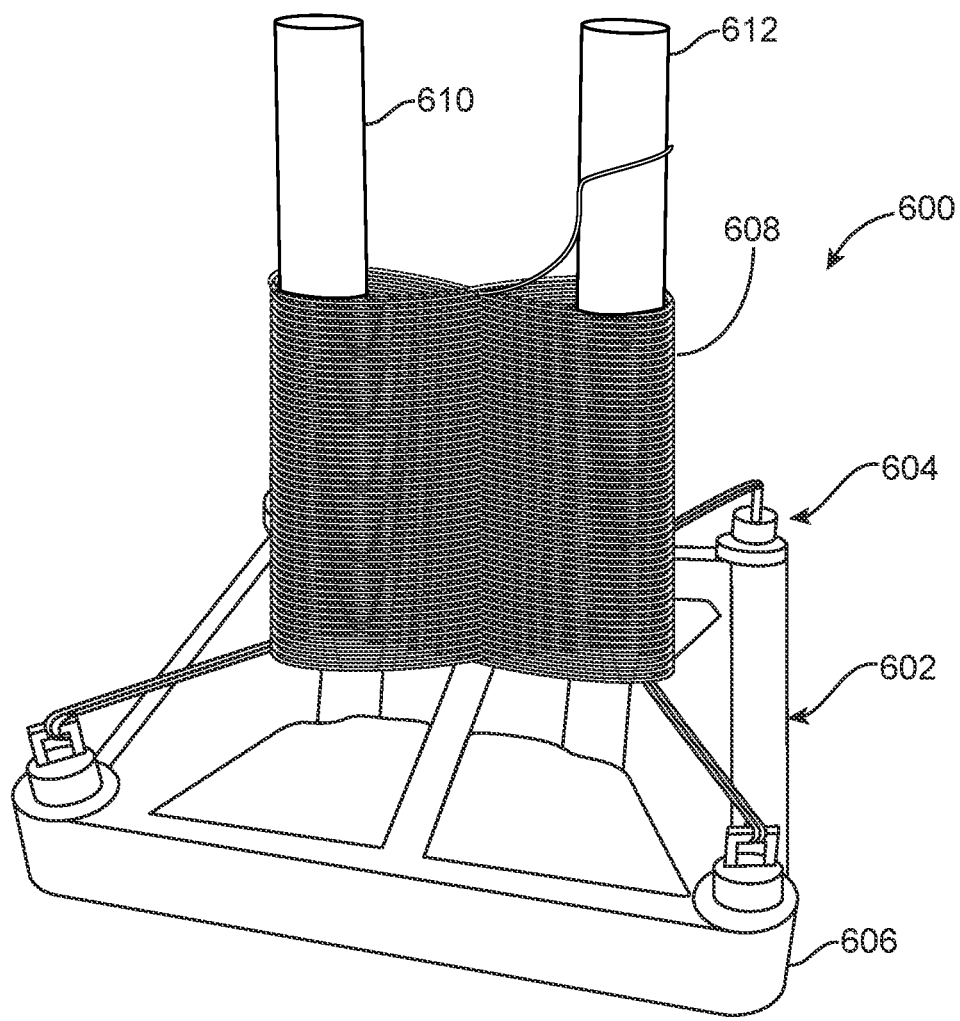
FIG. 6 illustrates a jig used to pack the net into the projectile module.

FIG. 3A illustrates an example structure associated with the projectile module 210/222 and which can include components of attachment module or gun 208/304. This can be called a gun component 304. Components 300 can include a first component 302 including a disposable net container that is prepared with a net or projectile using a tool or jig such as is shown in FIG. 6. One way of characterizing the first component is a cup structure in that there is an interior portion which receives the projectile and walls on all sides generally like a cup. The channels disclosed herein are configured in the walls of the cup in this characterization.

Figure 3B:
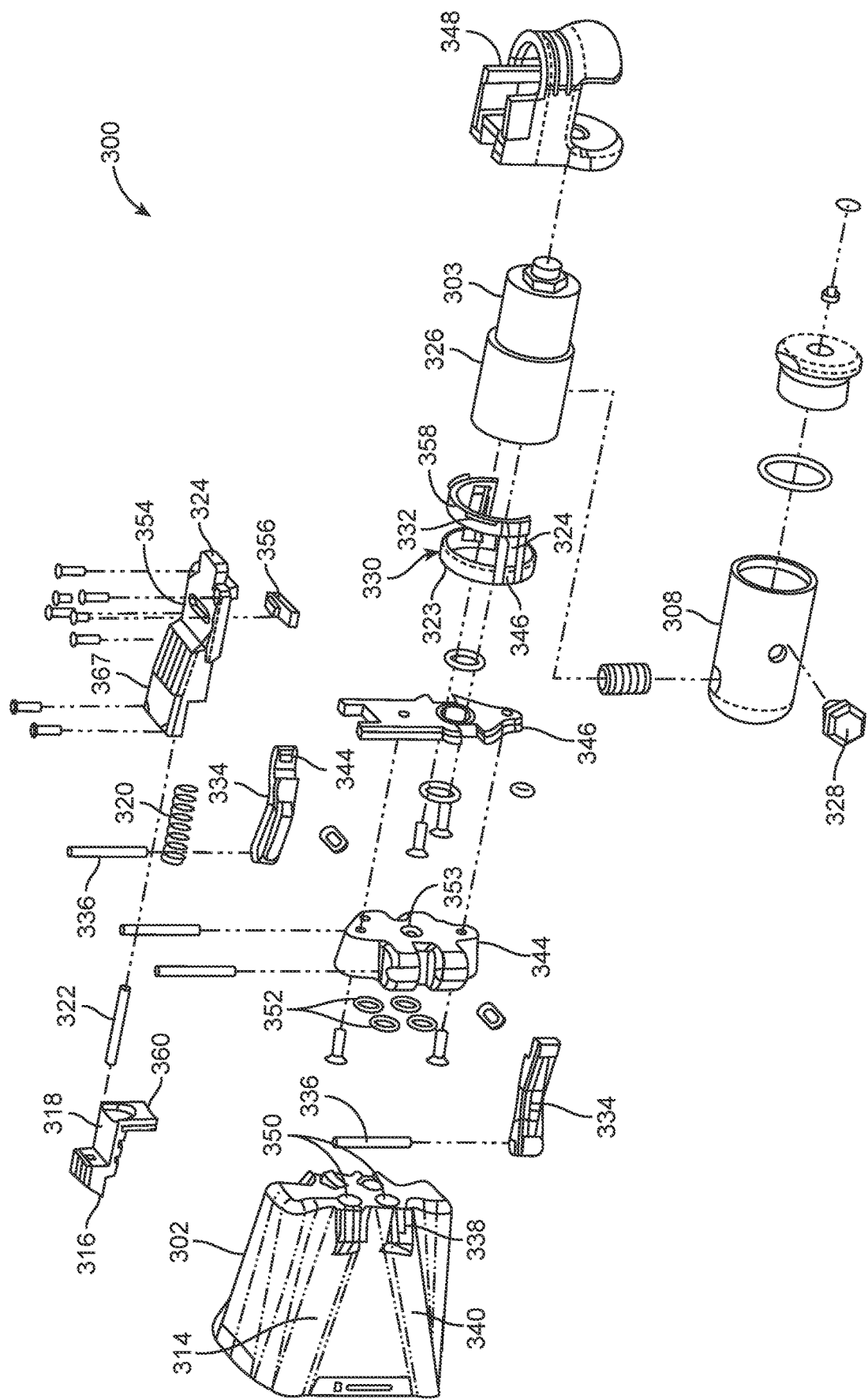
FIG. 3B illustrates an expanded view of the projectile module and gun base.

The first component 302 can also be characterized as a clip-on net head cartridge. It can be a single use cartridge or a multi-use cartridge. The overall system includes a gun portion 304 which is attachable to an object such as a drone and a removable/replaceable projectile module 302. The gun portion 304 includes a number of different components. The gun portion 304 can be attached to a structure configured under another object, such as a drone 200. To enable such attachment, a movable attachment component 318 is configured within a framework 317 on the gun portion 304. The attachment component 318 as well as other specific components discussed below are shown in FIG. 3A and FIG. 3B. A spring 320 is positioned between a portion 360 of the attachment component 318 and a top structure 366 of the gun portion 304. A rod 322 is also configured in connection with the attachment component 318 and the top structure 366 to guide the movement of the attachment component to enable a user to attach the gun to the object or detach the gun portion 304 from the object. To attach the gun portion 304 to an object, a person would move the attachment component 318 by using their finger to pull on the extension portion 360 so as to compress the spring 320. This would cause the attachment component 318 to move such that a securing member 316 moves to the right (according to the configuration in FIG. 3A) to a retracted position. With the securing member 316 in the retracted position, the user could engage the extending member 324 into a receiving opening on the object (drone, etc.) and then move the gun 304 upward into a locking position such that releasing the attachment component 318 causes the spring 320 to extend the securing member 316 to the left such that the gun 304 is locked into position.

In a locked position, the top component 367 will include an opening 354 and an electrical component 356, which can engage with an electrical connector on the object such that the object can trigger the firing of the projectile 342. An electro-mechanical connection between the gun 304 and the object 702 enables an easy approach of providing both the mechanical attachment as well as the ability to electrically communicate with control the gun 304 and projectile component 302 from the object. The electrical connection and mechanical attachment are achieved simultaneously in the single attachment motion disclosed herein utilizing, for example, spring-loaded pogo pins. A wireless communication could also be deployed using Bluetooth, a near-field communication protocol, or any other protocol.

One aspect of the structure of the gun portion 304 is the ability to control when the user is able to move the attachment component 318. For example, it is preferable that the user be able to attach or detach the gun portion 304 only when the removable projectile module 302 is in a locked position. If the user is able to detach or attach the gun 304 to the object when the head cartridge 302 is not secure, it could fall or detach accidently due to the movement of the gun portion 304. To control the ability to remove the gun portion 304 from the object, a rotatable safety member 330 is included. The safety member 330 is configured to be positioned on the cylindrically shaped gas valve component 326. The safety member 330 has several characteristics which ensure that the user can only attach or detach the gun portion 304 when the projectile module 302 is locked in place or in certain other configurations.

The safety member 330 includes an indented portion 346 (shown in FIG. 3B) which is configured on one or both sides of the safety member 330. The indented portion 346 has a complementary shape to a flange 344 (shown in FIG. 3B) configured on the inner end of one or more securing arms 334. The securing arms 334 are configured to be biased in a closed position such that the pins 336 engage with engagement members 338 on the projectile module 302. The user will attach the projectile module 302 by engaging with the securing arms 334, and compressing an end of the securing arms having the flange 344 such that the removable projectile module 302 can be positioned as shown in FIG. 3A. To lock the projectile module 302 into place, the user releases the securing arms 334 and the pins 336 will engage with the engagement members 338 on the head cartridge 302.

The safety member 330 and its indented portion 346 will then engage with the flange 344 to lock the projectile module 302 into place. In this position, an opening 358 on the safety member 330 will coincide with the position of the member 360 such that when the user pulls on the member 360, the attachment component 318 can move so as to compress the spring 320 and enable the user to attach or detach the gun portion 304. As can be appreciated, when the safety member 330 is rotated around the cylinder 326 such that the indentation 346 is not engaged with the flange 344 such that the user can attach or remove the projectile module 302 by manipulating the attachment arms 334, a safety flange 332 is rotated into a position between the member 360 and a position 319 on the gun portion 304, so as to prevent the user from manipulating or moving the attachment component 318. This is because the component 360 will butt up against the flange 332, preventing the attachment component 318 from moving the attachment member 316 into a position of enabling attachment or detachment of the gun 304. It is noted that there may be two or more flanges 332 configured on the safety member 330.

Without the ability to move the attachment component 318, a user could not attach or detach the gun portion 304 from the object because the person would not be able to retract the member 316. As is shown in FIG. 3B, the safety member 330 can include in one aspect, a ring shaped component 323 and a first extension member 321 and a second extension member in opposite positions on the ring such that a semicircular component or portion of the safety member can attach to the first extension member 321 and the second extension member. Note that the semicircular component can include one or more of the flange 332, an opening portion 358 and another flange not shown. The semicircular shape shown in FIG. 3B is by way of example. The portion of the safety member 330 containing the flange 332 could also be circular as well. In another aspect, the portion of the safety component having the flange 332 could be ring-shaped, and the portion having the indentation 346 could be semi-circular. The functionality of the safety component 330 is that it is configured to rotate on the cylindrical valve 326 from a locked position to an unlocked position for the head cartridge 302. There are number of different structures which can be implemented to enable this functionality and one example structure is provided.

The first extension member 321 is thicker than the ring shaped component 323 for the following functionality. When in a locked position as shown in FIG. 3A, the first extension member 321 and the second extension member (not shown) are thick enough to prevent the user from being able to manipulate the attachment arms 334 to attach or detach the projectile module 302. However, when the safety member 330 is rotated such that the thinner portion of the ring shaped component 323 coincides with the ends of the attachment arms 334, there is enough space between the ends of the attachment arms 334 and the ring shaped component 323 such that the user can manipulate the attachment arms 334 and either attach or detach the projectile module 302.

The safety component 330 therefore operates in the following manner. The gun 304 can be attached to the object either (1) when a head cartridge 302 is attached to the gun 304 and the safety component 330 is locked in the position shown in FIG. 3A such that the structure 358 enables the component 360 to be moveable to attach or detach the gun 304; or (2) when there is no head cartridge 302 attached and the safety component 330 is also in the same position shown in FIG. 3A. If the head cartridge 302 is attached but the safety component is not locked into the proper position, such that the head cartridge 302 could be removable or could fall off, then the user cannot attach or detach the gun 304 due to the flange 332 preventing the movement of the component 360 against the spring 320. A sticker or an indication can be positioned on the cylinder 326 to inform the user regarding whether the head cartridge 302 is locked in position or not. The sticker/indication would be placed typically on the cylinder 326 behind the position of the arm 321 shown in FIG. 3A. The indication could be paint, ink, or any kind of marking to illustrate or inform the user regarding the status of the head cartridge 302. Thus, if the safety component 330 is rotated such that the arm 321 is either above or below the location shown in FIG. 3A, the configuration of the safety component 330 would reveal the notification (like a red dot) that the head cartridge 302 is not locked into position.

Other components of the gun portion 304 include a compression chamber, accumulation reservoir, or gas reservoir 308, having a pressure indicator or dial pressure gauge 328. A canister 306 of compressed air or $CO_2$ can be attached to the compression chamber 308. An intermediate chamber or gas valve 326 can receive the compressed air as controlled by the gun portion 304 such that, upon firing, the gas can flow into a splitter component 344 that splits the flow of gas from an intake portion 353 into two or more output channels represented by O-rings 352. The O-rings 352 or a rubber component for each opening is used to seal an opening on the splitter 344 with the respective opening 350 on the head cartridge 302. In other words, the other side of the splitter component 344 has two or more openings that are configured to coincide with the openings 350 on the projectile module 302. In a locked position in which the pins 336 lock with the engagement members 358, the O-rings 352 will provide an airtight channel between the exit openings on the splitter component 344 and the input openings 350 on the projectile module 302.

While separate O-rings 352 are shown as providing a seal between the component 344 and the openings 350, in another aspect, a single gasket can be used to seal the interface between the removable head cartridge 302 and the gas splitter 344. In some cases, individual O-rings can be susceptible to fall out. The single gasket can have four openings in a scenario where there are four channels for gas to flow. In another aspect, the gasket could be configured for a different number of openings as well. A single gasket which provides the sealing function can insure a more stable seal and the more simple manufacturing process then individual O-rings.

The gas reservoir 308 is used to ensure that there is a repeatable and consistent gas pressure at which the projectile is fired. When making the calculations regarding when to fire the projectile, the system needs to have a high confidence level in the gas pressure at which the projectile is fired. Otherwise, the speed at which the projectile is fired can vary or be inconsistent.

A component 348 can be attached to the gun portion 304 to protect some features of the gun 304 such as the gas valve component 326.

Figure 5:
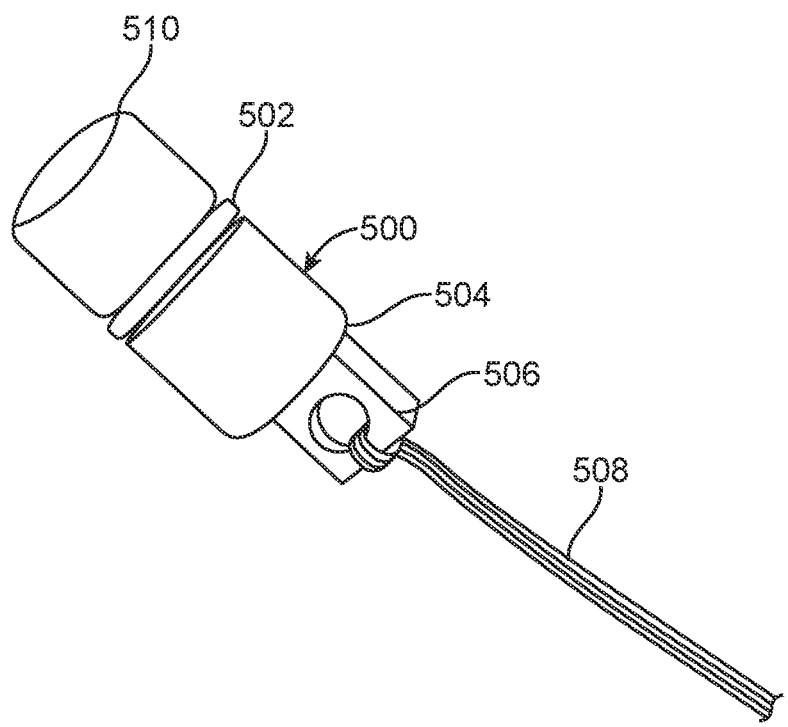
FIG. 5 illustrates an example weight associated with the projectile.

The projectile module or cup structure 302 includes a number of channels 314, 340 configured in the walls of the structure which receive weights as shown in FIG. 5. Each respective channel 314, 340 receives a weight such that a rounded end of each respective weight can be seen in the opening 350. The channels are configured within the walls of the cup or head cartridge 302 and each channel has openings at both ends. A first opening of the respective channel is used to receive the weight for insertion into the channel and to enable the weight to be shot or projected out of the channel. A second opening of the respective channel is used to enable the pressurized gas into the channel to push or force the weight through the channel and out the first opening. Feature 350 represents the respective second openings of each of the channels in the head cartridge 302. The respective weights will be positioned at locations 366, 368 shown in FIG. 3A. Each respective weight will have a line 362, 364 attached to it that is also attached on the other end to the projectile 342. When the system fires, the compressed gas will flow from a threaded inert gas bottle or canister 306 to the compression chamber 308 into the solenoid component 303 connected to a gas valve 326 and through an opening in the brackets 346 to the opening 353 in the splitting component 344 such that each opening 350 (which can include one, two, three, four, or more openings) will experience a high enough air pressure to cause the respective weights to travel quickly through the channels 314, 340, such that they break out of a breakable seal 310 on the projectile module 302. An electrical signal can be provided from the object to the electrical component 356, which can cause the solenoid 303 to activate and cause the firing the projectile. The moving weights will then pull the projectile 342 out of the opening 312 and towards the respective target. The solenoid 303 can be a coil wound into a tightly packed helix which can produce a uniform magnetic field in a volume of space when the electrical current is passed through it. This component can also be characterized as a solenoid valve which, when integrated with the component 326, will actuate the valve 326 to cause the gas to flow from the accumulation reservoir 308 through the valve 326 and the splitter component 344 the fire the projectile.

Cockleburs can be configured on strings between weights and a net 342 such that when the net interacts with a target device 216 and begins to wrap around the device, the cockleburs become entangled within the net 342 preventing the net from slipping off the target device 216. This characteristic can improve the probability of a successful capture of the target device 216 and thus can be included in the analysis by the control module 204 when determining a probability of success depending on the different weapon systems available and the characteristic of the target device 216. For example, if the classification of the target device 216 is one that has a single wing and small propeller such that a standard net might easily slip off, the control module 204 may choose a different net in a different projectile system 222 that includes cockleburs which increases the probability of a successful capture. Drawstrings or other components of a net can be also used to improve the ability of likelihood that a net will capture a target device 216. Where such features can improve the probability of success, they are taken into account by the control module 204.

The weights that are used will fit within the channels 314, 340 at their position 366, 368 in a manner such that upon the application of the gas pressure from the component 344 and other components that the pressure will cause the weights to move down the respective channels 314, 340 at a predictable speed. The channels have respective openings at both ends. The O-rings 502 (see FIG. 5) around the weights can also provide the air seal to enable in the firing process. The material of the weights can be metal such as stainless steel but it can also be other materials as well such that the proper weight of each of the weights can be configured.

The firing direction 312 is shown and a sealing 310 can exist at an opening of the projectile module 302, which can be used to seal the first component for dirt or water ingress protection. For example, aluminum foil 310 can be used to cover the opening, which can easily be broken upon firing. Not shown is an optional string or line that can be attached to the projectile 342 at a first end and which can have a connector at a second end, which can be attached to the object or the drone. The optional string can then be used to retrieve the target object rather than merely causing the target object to fall to the ground.

It is noted that FIGS. 3A and 3B illustrate the projectile module 302. Another term for the projectile module 302 can be a single head cartridge. The cartridge could be 3D printed on site. For example, a customer could receive a drone and a gun component 304 with computer-readable configuration instructions for printing projectile modules or single head cartridges in the field using a 3D printer. Thus, in terms of a product-by-process embodiment, the product of the gun 304 having an attached projectile module 302 can include receiving a physical gun 304, as described herein, and receiving computer-readable instructions for instructing a 3D printer to create the projectile module 302 configured to receive the projectile and respective weights as described herein, and configurable to be removably attached to the gun. The cartridge could also be injection molded as well.

Other example configurations could include a dual launcher in which multiple gun components 304 can receive multiple head cartridges 302. In this configuration, the object to which the multiple components are attached to can be configured to provide an electrical signal to each respective unit so that multiple shots can be available. The overall system can also be configured to have more than two units such that three or more projectiles can be fired.

Figure 4:
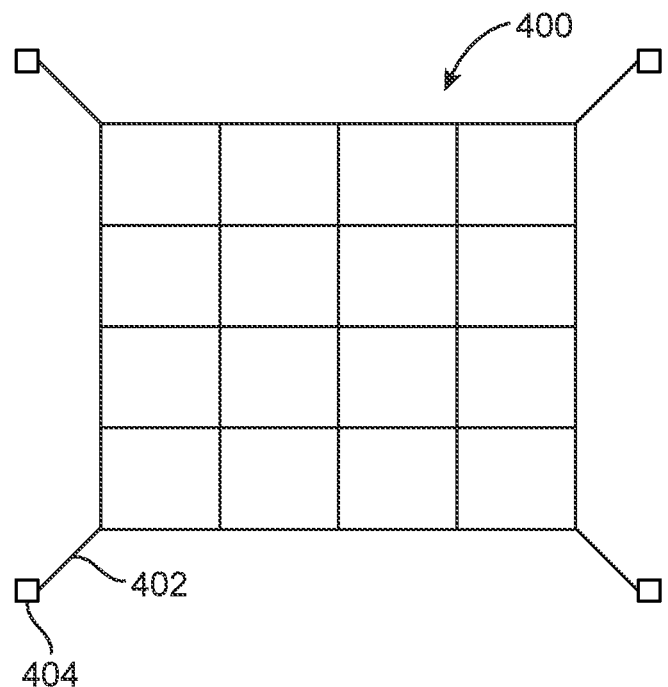
FIG. 4 illustrates an example projectile.

FIG. 4 illustrates a net 400 which can be used as a projectile. An example net is 3.2 m by 3.2 m square with approximately 40 cm spacing between the strings. Of course this represents only an example net configuration and this disclosure contemplates a number of different configurations. For example, the nets might be circular, oval, rectangular, or have a random or more complicated shape. The net in FIG. 4 includes corner component and strings 402 used to attach each weight 404 to a corner. The string 402 can include cockleburs to cause the net to become entangled as it envelops a target device. Each weight at a corner of the net has a certain configuration that will be discussed in FIG. 5.

An example net material is a 0.6 mm diameter Dyneema string. Other diameters and string material are also contemplated as well. In one example, each corner of the net has a tail that is used to attach a respective weight 404. The component 302 is configured to accept a variety of net sizes. For example, feature 212 can be of one size and feature 214 can represent another size. The net size described above with the 3.2 m×3.2 m square shape is considered one size that can catch a majority of target devices. The feature 212 and similar features can include such characteristics as nets having cockleburs for enabling the net to be entangled upon impact at the target device 216, different types of weights on the net, different cocklebur configurations, drawstring configurations, and so forth. Each of these different net configurations or other projectile or signal configurations can be taken into account when evaluating a probability of a successful capture and for selecting a chosen projectile module and attack plan to capture the target device 216 or devices 216/217.

The number of weights also can vary. For example, if the net shape is circular, the system may deploy the net with three weights or five weights. More or less weights are also contemplated and can be included in the overall projectile design. The weights may be of the same weight and configuration or may be different weights or different configurations depending on the projectile model. For example, heavier weights on some edges can cause the net to travel through the air differently.

FIG. 5 illustrates an example weight 500. In one example, the weights are made of stainless steel, but other materials are also contemplated. An example weight is cylindrical in shape and has an O-ring groove 502 and a string attachment point 506. A distal end 510 of the weight has a preferable configuration of being rounded but could also be squared off as well. An O-ring 502 on the weight 500 is positioned to allow the weight to sit snugly in a respective channel 314, 340 at the proper position 366, 368. Having the respective weight fit within the net head cartridge 302 at the proper position provides a more powerful deployment of the projectile. Each respective weight's leading edge 504 is configured with a sharp corner or edge which lessons a likelihood of jamming the string (connected to the net or projectile) as the weight 500 travels through the channel 314, 340. A tail 508 attaches the weight 500 to a corner or a component of the net 400. A width of the string attachment point 506 is typically less than a width or diameter of the weight at point 504. The difference in width of these two portions of the weight 500 is purposefully designed to enable the deployment or the transition of the weight from point 366, 368 through the respective channel 314, 340 without the string 508 getting caught between the weight 500 and an interior surface or channel wall as the weight moves through the channel 314, 340. Having a rounded end 510 of the weight, with an O-ring 502 in the middle, and a sharp edge 504 at the other end of the weight 500 enables an improved process of firing the weight through the barrel or channel 314, 340 without the string 508 being tangled or fouled in the process.

There are a number of benefits of using an O-ring on the weight 500. For example, using the O-ring simplifies the manufacture of the weight 500 because it reduces the precision required. The O-ring can seal the gas upon firing and can physically retain the weight 500 in place so that it does not slide or move out of position. The O-ring is configured within a channel or groove that is in the outer surface of the weight 500 and which is configured to receive and retain the O-ring in place.

While the shape shown in FIG. 5 it is preferable for the weight, other configurations are contemplated as well. For example, a square or rectangular shape could also be applied. A swivel point for a rifled configuration could be between the weight at position 504 and the string attachment component 506. A swivel point could also be near a middle region such as where the O-ring 502 is configured. The weight could also be spherical in shape with an attachment component 506 configured at a location on the sphere.

One purpose of the O-ring 502 is to maintain the respective weight at its proper position 366, 368. If the weights are in different positions within a respective channel 314, 340, each respective weight could deploy at different speeds or different velocities, which can be problematic in that the system is determining a prediction of the path and speed of the projectile which includes an expectation of a consistent or expected speed of the weights as they deploy. Accordingly, the use of the O-rings 502 helps to ensure that the weights are in their proper and expected position 366, 368 within the projectile cartridge 302 prior to deployment.

In another aspect, the diameter of the weight 500, relative to the channel interior diameter 314, 340 can be close enough to prevent a respective weight from shifting or moving within the channel prior to firing. Accordingly, while the use of the O-ring 502 is beneficial, is not considered an essential feature.

In one aspect, the channels 314, 340 can be rifled such that helical grooves can be provided in a round bore. Any kind of rifling configuration of the barrels 314, 340 can be applied. In this aspect, the weights 500 can also be made to match the shape of the bore so that the respective weights would grip the rifle bore and spin in a certain direction. In one aspect, the weights 500 could include a swivel such that the string attachment point 506 can twist independent of the weight 500.

FIG. 6 illustrates a tool or jig used to prepare a net for insertion in the net head cartridge 302. Preparing a net (when a net is the projectile) involves configuring the net to be inserted into the cartridge 302 with the respective weights being pushed down the barrels 314, 340 into the proper respective position 366, 368 such that the net 342 deploys properly. This is not an easy process. Therefore, FIG. 6 shows an example tool for preparing the net for insertion into a head cartridge 302. Turning to FIG. 6, the net 608 rests in a container that has four barrels 606, one barrel being positioned at each corner of the net container 600. The barrel 606 is a hole or opening for a respective weight 604 attached to the net. The container 600 is removable from the projectile module 210/222. Each respective weight 604 is loaded into a respective barrel 606 and the net 608 is placed in between them in the container 600. Shafts 610, 612 can be used to position the net 608 in such a configuration that prevents the net from jamming as it is deployed. A shape of the net container 600 is shown to be square 602 in FIG. 6. But this is not an essential characteristic of the net container 600. For example, if the net were to have a circular configuration or triangular configuration, and three weights were used for a deployment, a shape 602 of the net, container 600 might be circular or triangular. The shape may also be circular if, for example, five weights were used. Thus, the particular shape of the net container 602 can vary depending on the shape of the net to be deployed or other factors.

The net 342 with the weight(s) attached and the head cartridge 302 can together be considered a removable or disposable single net shot. They can be traded out each time the device is used. For example, a disposable net head cartridge 302 can be used once or a number of times. Packing the nets to ensure that is that they deploy correctly and accurately is favorable. One reason to provide a removable or disposable single net shot is that customers who utilize the projectile modules will not want to pack them themselves and will want single shot disposable net containers that make it more simple to utilize the technology.

The head cartridge 302 can also have a number of different configurations. The example shown in FIGS. 3A and 3B are generally rectangular in configuration with four channels, each containing a single weight. The net head cartridge 302 could also have a square shape, or a circular shape or a nonsymmetric shape. Typically, the number of weights will be four. However, in other configurations, the number of weights could be one, two, three, five, or more and configured in different locations. The number of weights could depend on a shape of the projectile or other factors. For example, a triangular-shaped projectile could have 3 weights, wherein each point of the triangle has a respective weight. The channel configuration (314, 340) can also vary in number depending on the number of weights needed for a particular projectile configuration. For a 3 weight system, the head cartridge 302 can have three channels, and so forth.

Where the configuration of the head cartridge 302 changes, corresponding changes could be made to the gun 304. For example, the component 344 could be adjusted so that there are only 3 openings 352 if the configuration of the head cartridge 302 only had channels for 3 weights. In another example, the component 344 may have a fixed number of openings through which gas can flow and the head cartridge 302 may provide variable openings depending on its configuration. In this scenario, for example, the gun 304 may have a component with 5 openings with a respective O-ring 352 at each opening. Different head cartridge 302 configurations could be attached such that in one scenario, the head cartridge may have 5 openings with 5 weights in which each opening in the head cartridge 302 has a corresponding opening in the component 344. Another head cartridge 302 may have three or four weights and thus three or four openings. Such a head cartridge could be configured to align the three or four weights in their respective channels with appropriate corresponding holes in the component 344. A closed portion of the head cartridge 344 could seal off the other openings in the component 344 that do not have corresponding channels in the head cartridge 344 to maintain the necessary gas pressure in the system to fire the projectile.

Figure 7:
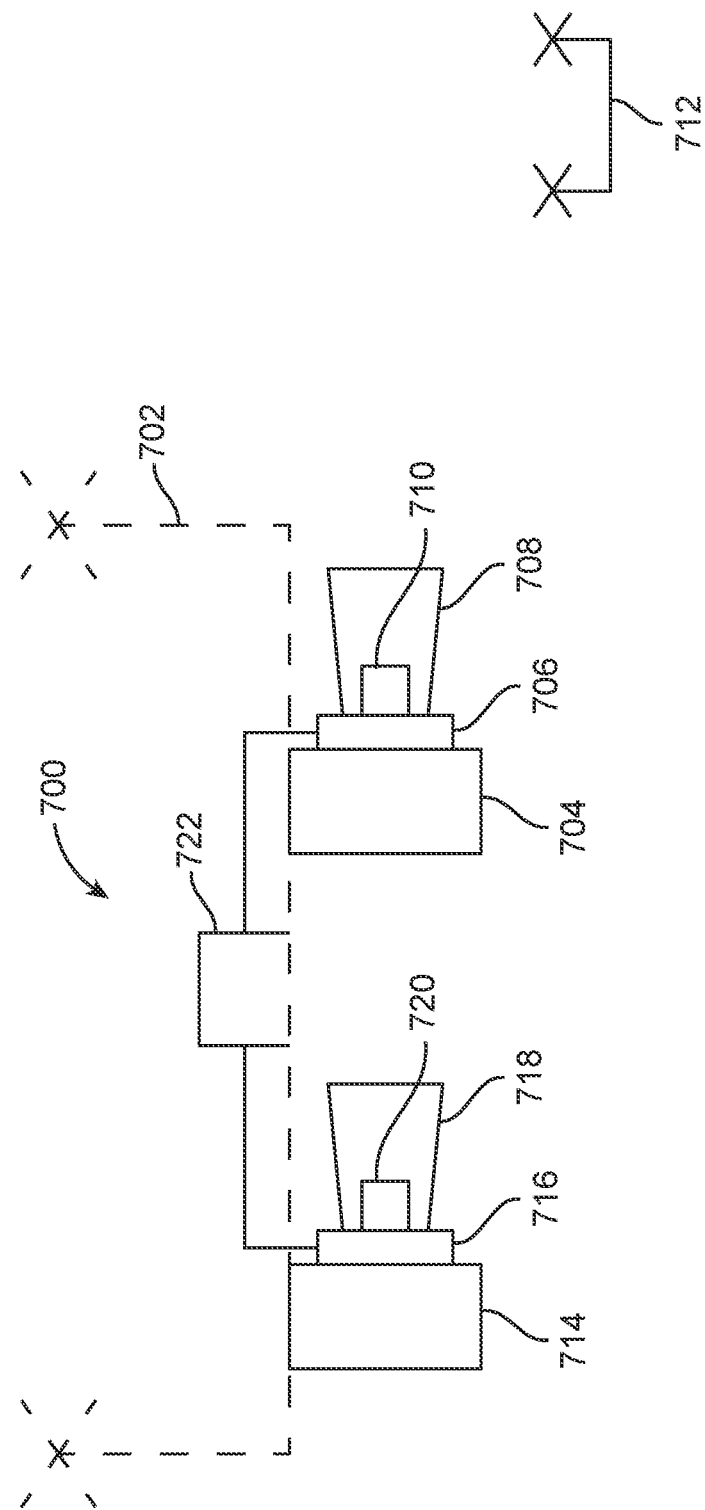
FIG. 7 illustrates the detachable nature of the projectile module.

FIG. 7 illustrates another example of a system 700 with a drone 702 having an attachment component 704 with an interface 706 between a projectile module 708 and a replaceable projectile container 710. In the example described herein, in which the projectile (net) has weights which are contained within barrels 606 as part of a projectile container, compressed air is used the fire the net. In one aspect, when the projectile 710 is fired, as disclosed herein, a string can be maintained at the drone 702 and the target drone can be captured by the net. In other words, a tether can be established such that rather than merely surrounding a target device with a net such that it falls from the sky, a capturing operation with a tether can be implemented. The drone 702 can then capture and carry a target drone down from the sky rather than having the target drone fall from the sky after it is covered by the net. The component 704 attached to the drone can also include mechanisms, such as a release mechanism so that the drone 702 could lower the captured drone down and release the tether at a safe elevation or the safe location. In this regard, a computer model that would be implemented to determine when to fire the net can take into account an identification of the target drone which can gather such features as its weight to determine whether the flying device 702 can capture and carry the target drone or not. In this regard, the computer model could also include a release mechanism in which it determines whether to capture the target drone and carry it to the ground via a tether or whether not to utilize the tether and simply fire the net at the target drone to take it out of the sky. As noted herein, the algorithm can also use such data to determine or choose which projectile module to use from a plurality of projectile modules.

Factors which can be taken into account include a weight of the target device, a perceived danger of the target device, whether the target device has a payload, and so forth. For example, if the target device is determined to have an explosive on board, the flying device 702 can, based on that determination, capture the target drone with the tether and carry it to a safe location for disposal or destruction. There can be a tether 343 for capturing the object (target drone) and a release mechanism 345 as well for releasing the captured object from the drone. The tether release mechanism 345 is shown at a particular location on the gun base 304 but can be located at any location in the overall system. The tether 343 can be connected to the projectile 342 at a first end and the tether release mechanism 345 at a second end. After capturing a target object, the system can retrieve the target object and use the tether release mechanism 345 to controllably drop the target object. For example, the drone can capture the target object using the projectile 342 and having the tether 343 attached to the projectile 342, can controllably lower down to the ground and at an appropriate height, can initiate the tether release mechanism 345 for dropping the target object on the ground. The tether release object can be electrically controlled through the signals provided physically 354/356 or wirelessly. The system could include the projectile module 302 having the tether 343 attached to the projectile 342 at the first end and a second end could be attached to an attachment component at the second end which is taped temporarily to the outside surface of the projectile module 302. The user then attaches the projectile module 302 to the gun base 304 and using the attachment component connected to the second end of the tether 343 to attach the tether to a tether release mechanism 345 located somewhere on the system.

Component 704 and/or 706 can also represent an adjustment module which can be utilized with just an orientation of the projectile module 708. For example, a target device 712 might be positioned at a certain angle relative to the drone 702. Computer algorithms operating on the drone 702 might determine that a particular orientation of the drone 702 is not optimal or preferable for firing the projectile 710 at the target drone 712. However, it might be preferable, given when conditions or other conditions, not to adjust the entire orientation of the drone 702, but only to adjust the orientation of the projectile module 708. In this scenario, adjustment components can be built into features 704 and/or 706 such that a command module on the drone 702 can utilize the determination or output from the computer algorithms associated with the various conditions as described herein, and instruct the component 704/706 to reorient the projectile module 708 in a more favorable orientation for the deployment of the projectile 710. After the reorientation, the computer models can take into account the new direction at which the projectile would leave the projectile module 708 and then make new determinations regarding when to fire the projectile at the target device 712.

Component 714 and/or 716 can represent an adjustment module which can be utilized with just an orientation of a projectile module 718. For example, the target device 712 might be positioned at a certain angle relative to the drone 702. Computer algorithms operating on the drone 702 might determine that a particular orientation of the drone 702 is not optimal or preferable for firing the projectile 710 at the target drone 712. However, it might be preferable, given when conditions or other conditions, not to adjust the entire orientation of the drone 702, but only to adjust the orientation of the projectile module 718. In this scenario, adjustment components can be built into features 714 and/or 716 such that a command module 722 on the drone 702 can utilize the determination or output from the computer algorithms associated with the various conditions as described herein, and instruct the component 714/716 to reorient the projectile module 718 in a more favorable orientation for the deployment of the projectile 720. After the reorientation, the computer models can take into account the new direction at which the projectile would leave the projectile module 718 and then make new determinations regarding when to fire the projectile at the target device 712.

FIG. 8 illustrates an example of how the component shown in FIG. 7 might be implemented in more detail. FIG. 8 illustrates a system 800, which can include some components that can be attached to a flying vehicle represented by feature 704/714 and/or 706/716 in FIG. 7 and other components which can be configured in a detachable way represented by features 708/718 and/or 710/720. In FIG. 8, a tank 802 contains compressed nitrogen for use in deploying the net 820. The tank is attached to feature 804 which enables nitrogen to be provided to a compression chamber 806. The system requires the gas to be compressed a certain pressure in order to adequately deploy the net. In one example, a separate chamber 806 is shown to ensure that the gas is compressed to the proper pressure. In another scenario, only the tank 802 is used in the pressure in the tank can be controlled by the system.

Feature 808 represents a solenoid valve or other valve that is used to trigger the launch of the projectile. The valve 808 can be attached to the reservoir 806 on the intake side and exits through the barrels 816, 818 in the projectile container 826. A distribution manifold 812, 814 exist between the solenoid valve 808 and the projectile container 826 to split the expanding nitrogen into multiple channels and directly to the net barrels 816, 818. The O-rings 828, 830 are shown on the weights contained within the barrels 816, 818. The O-rings seal all the connections between the parts and enable the projection of the net 820. The solenoid 808 can receive an electrical signal from an operating computer 826. The operating computer 826 is typically deployed on the flying vehicle 702 and has an electrical connection to the projectile module for enabling the transmission of the signals to fire. In general, the control system on the flying vehicle will perform the analysis utilizing the models described herein to determine, based on the various factors, the moment at which to fire the projectile.

It is preferable to improve compressed nitrogen be used in a disposable cartridge that can be used to launch the gun. Feature 306 represents an example of the disposable cartridge. Typically, each shot uses 1 cartridge. An aluminum reservoir 806 is represented that can have a puncture insert that can be used to attach the cartridge 802 to the projectile module and store an appropriate amount of gas at the right pressure to deploy the net. Ideally, the reservoir 806 might have or might be a cartridge itself. One incentive to use the reservoir 806 which can maintain the nitrogen at the appropriate pressure is the existence of nitrogen cartridges for purchase that can easily be used.

Figure 9:
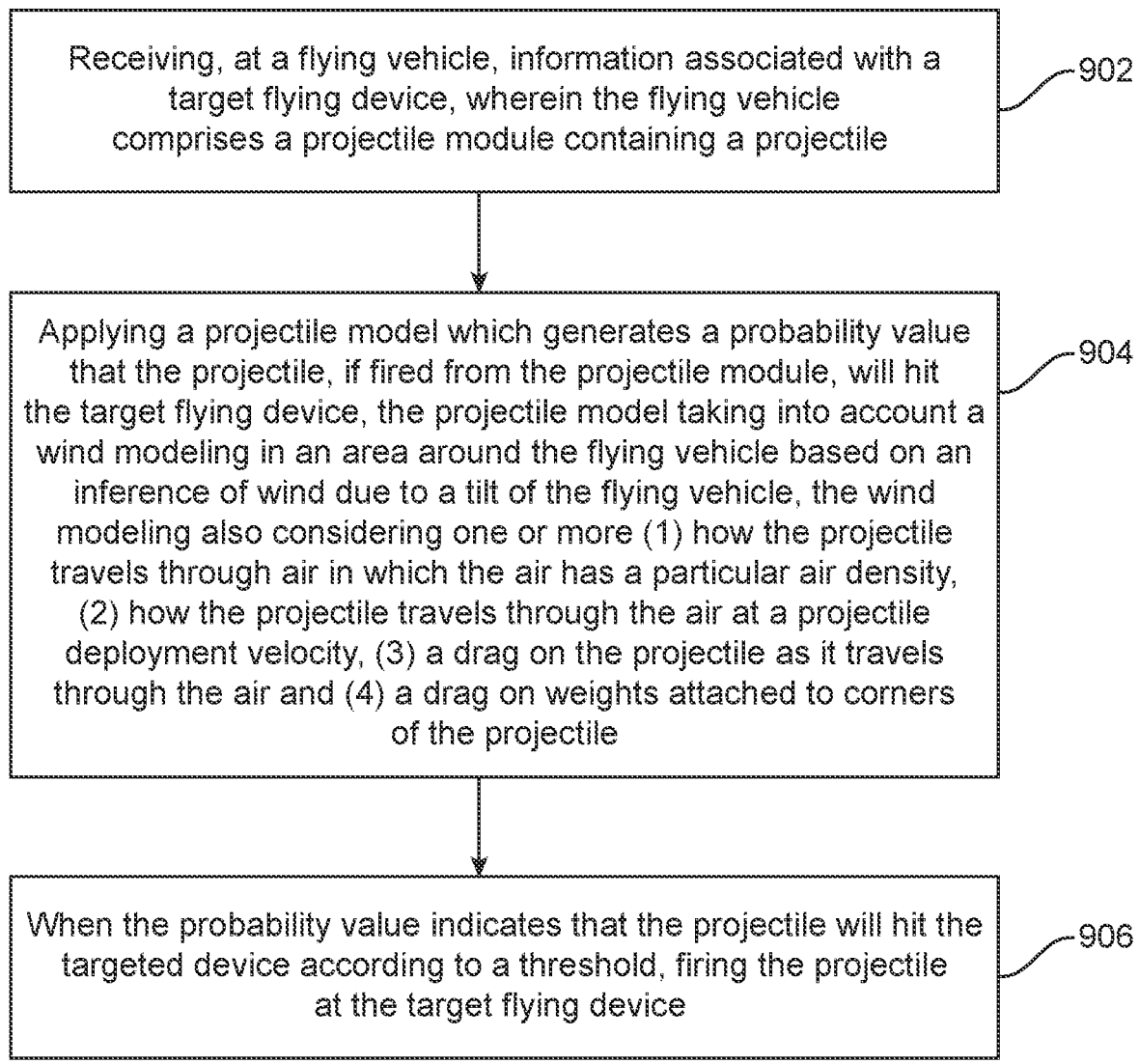
FIG. 9 illustrates a method embodiment.

This disclosure now turns to the method aspects and focuses on the computer models that have been developed to determine a timing associated with when to fire a projectile from a first flying device to a target device. FIG. 9 illustrates a method example. A method includes receiving, at a flying vehicle 200, information associated with a target flying device 216, wherein the flying vehicle 200 can include a projectile module 210 containing a projectile (902), applying a projectile model which generates a probability value that the projectile, if fired from the projectile module 210, will hit the target flying device 216, the projectile model taking into account a wind estimate in an area around the flying vehicle 200 based on an inference of wind, the wind estimate also considering one or more (1) how the projectile travels through air in which the air has a particular air density, (2) how the projectile travels through the air at a projectile deployment velocity, (3) a drag on the projectile as it travels through the air and (4) a drag on weights attached to corners of the projectile (904) and, when the probability value indicates that the projectile will hit the targeted device according to a threshold, firing the projectile at the target flying device (906). Any one or more of these factors can be included in determining which projectile module to choose from a plurality of projectile modules as described herein.

The projectile can include one or more of a net, a streamer, a pellet, a laser, a signal jammer, a bullet, a bean bag, a weighted net having a weight attached to each corner, or an explosive. The projectile module 210 can include one or more characteristics including: (1) being attached to the flying vehicle 200 in a fixed position, (2) having a protective cover that is broken upon deploying the projectile, (3) containing two or more projectiles, and (4) having containers that store weights attached to the projectile. The projectile module 210 may also include a tether component in which the projectile is fired, and a tether maintains a physical connection between the flying vehicle 200 and the projectile. The projectile module 210 can be attached to the flying vehicle 200 and can include an adjustment component that enables the projectile module 210 to change its orientation independent of a position of the flying. A control module 204 can be configured on the flying device 200 and have an electrical connection to the projectile module 200 adjusts an orientation of the projectile module 210. The projectile model can further consider one or more of a flying vehicle position, a flying vehicle pitch, a flying vehicle yaw, a flying vehicle velocity, a target flying device manufactured specification, a target flying device current position, a target flying device velocity, a geographically defined safe area, known flying capabilities of the target flying device, a flying vehicle roll and a wind velocity. The projectile model can also take into account a target flying device 216 characteristic in terms of whether to deploy a projectile that is tethered to the flying vehicle 200 or not. The flying device characteristic can include such features as a weight of the flying device 200, a payload associated with the flying device 200, a danger identified or associated with the target flying device 216, a geographic area over which the flying device currently is or where it may travel, and so forth. Of course the flying device of FIG. 7 or FIG. 11 can also be applicable to these features above.

For example, if the target flying device 216 appears to be containing a payload which is identified as an explosive, and the target flying device 216 is near a restricted geographic area, such as a stadium, the flying vehicle 200 may deploy a projectile with a tether attached to the flying vehicle 200, such that the flying vehicle 200 captures the target flying device 216 and can carry it to a safe location. This is of course desirable to avoid the target flying device 216 from simply being surrounded by, and fall from the sky over a populated area, such as a stadium. The flying vehicle 200 can include components which will be controllable by control system 204 to either attach a tether to the projectile or detach a tether to the projectile prior to firing the projectile at the target flying device 216. A multi-vector attack plan in one example could include a capture of target flying device 216 and shooting down or disabling target device 217. The choice of arsenal weapons, determination of which target device to seek first, and so forth can be implemented by the control module 204.

In one aspect, the model can take into account assumptions as well. For example, the computer model may assume that for one half of a second, the target device 216 will fly in a straight line from its last known position and velocity. This assumption can be adjusted based on identification of the target device type, a determination of whether the target device 216 is a danger and potentially likely to take evasive maneuvers, and so forth. In one example, the modeling of the predicted path can take into account the position, velocity and direction, and assumes that same direction for a small period of time. Of course, that time can vary from a fraction of a second to one or more seconds.

The projectile module 210 can further consider one, two or more of the flying vehicle position, the flying vehicle pitch, the flying vehicle yaw, the flying vehicle velocity, the target flying device manufactured specification, the target flying device current position, the target flying device velocity, the geographically defined safe area, the known flying capabilities of the target flying device, a flying vehicle roll and the wind velocity.

Applying the projectile model can be performed based on an orientation of the flying vehicle 200. For example, the computing device or control system 204 on the flying vehicle can determine, based on an orientation of the flying vehicle 200, what the wind speed is. For the flying vehicle 200 to maintain a stable position in a wind, it must tilt into the wind in order to take into account the wind. The models disclosed herein can utilize the information about the wind speed inferred from the tilt of the flying vehicle 200 (or in any other manner) in its evaluation of the flight path of the projectile and the location of the target device 216. In other words, it is not material to this disclosure how the wind estimate is obtained. Using a tilt of the flying vehicle is just one suggested way. Utilizing the wind speed can improve the accuracy of the timing of when to fire the projectile and achieve a successful engagement of the project with the target device. Such information can also be taken into account when determining a probability of success between using different weapons in the arsenal when there are multiple projectile modules 210/222 and other weapons to choose from.

The method can further include applying the projectile model to generate a new desired orientation of the flying vehicle 200. Adjusting the orientation of the flying vehicle 200 to the new desired orientation of the flying vehicle 200 can occur before firing the projectile from the projectile module 210. The flying vehicle 200 can further reapplying the projectile model after adjusting the orientation of the flying vehicle. In another aspect, the orientation of the flying vehicle 200 may remain the same, but an adjustment module can be configured to enable only a reorientation of the projectile module direction. Thus, if the flying vehicle 200 is in a wind, for example, and is advantageous to the flying vehicle 200 to maintain its orientation given the wind speed, the system can only adjust the orientation of the projectile module 210 while maintaining the overall orientation of the flying vehicle 200 and then fire the projectile. A gimbal can be configured between the flying vehicle 200 and the projectile module 210.

Figure 10:
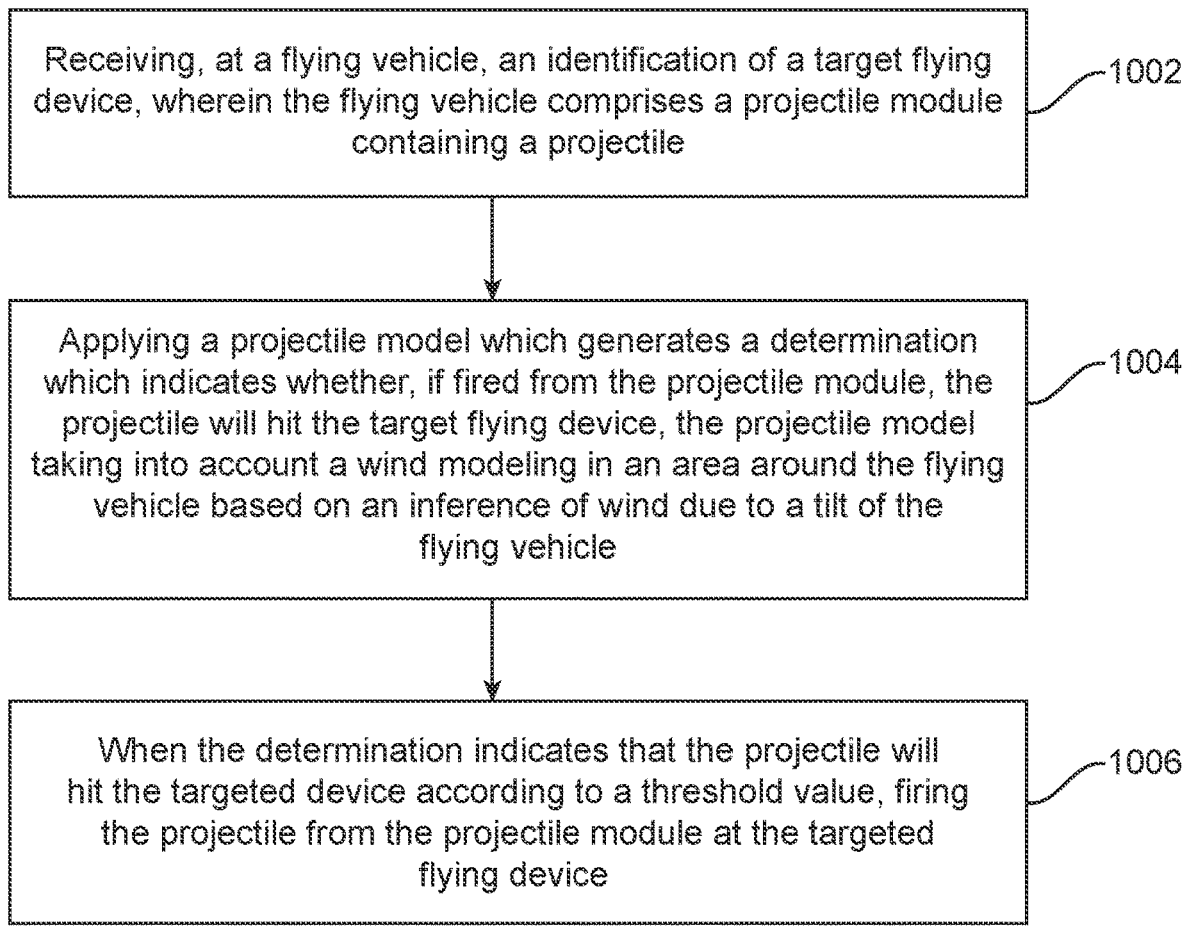
FIG. 10 illustrates another method embodiment.

FIG. 10 illustrates another example method embodiment. A method in this regard includes receiving, at a flying vehicle 200, an identification of a target flying device 216, wherein the flying vehicle 200 includes a projectile module 210 containing a projectile (1002), applying a projectile model which generates a determination which indicates whether, if fired from the projectile module 210, the projectile will hit the target flying device 216. The projectile model can take into account a wind estimate in an area around the flying vehicle 200 based on an inference of wind (1004). When the determination indicates that the projectile will hit the targeted device 216 according to a threshold value, the method includes firing the projectile from the projectile module 210 at the targeted flying device (1006). The modeling can also include a combination of modeling of the projectile as well as a predictive algorithm regarding whether the projectile will interact with the target device 216.

The flying vehicle 200 may have a first orientation. In this case, the method can further include, when the determination does not meet the threshold value at the first orientation, identifying a new desired orientation of the flying vehicle 200 or a new desired orientation of only the projectile module 210 attached to the flying vehicle 200 at which the determination would meet the threshold value. The method can include reorienting the flying vehicle 200 and/or the projectile module 210 at the new desired orientation and firing the projectile from the projectile module 210 on the flying vehicle 200 at the new desired orientation. The method can include rerunning the projectile model at the new desired orientation to yield a new determination and when the new determination indicates that the projectile will hit the target flying vehicle 216 within a second threshold value, firing the projectile from the projectile module 210. In this scenario, the threshold value can be one of the same as or different from the second threshold value.

The projectile model can take into account one or more of (1) how the projectile travels through air in which the air has a particular air density, (2) how the projectile travels through the air at a projectile deployment velocity and (3) a drag on the projectile as it travels through the air to yield the determination. It is noted that the drag on the projectile as it travels through the air can include an evaluation of both the material, size of material, and configuration of a net, for example, as well as the size and position of the weights attached to the net as described herein. The projectile can include one or more of a net or a weighted net having a respective weight attached to each corner of the net or in various locations on net if the net is circular. The projectile model can include a model of drag associated with a net deployment expansion as well as relative to wind. The projectile model can also take into account one or more of a projected path of the target flying vehicle 216 and known navigation capabilities of the target flying vehicle 216. The projectile model can also apply net model parameters including how fast the projectile exits the projectile module 210 upon firing, an air density, and an amount of drag on the projectile.

In another aspect, a flying vehicle 200 may be equipped with a system that includes several projectiles of different types or of different sizes. For example, the projectile module can include a packet of pellets, taser electrodes, and/or a net. The computer model which evaluates the various factors disclosed herein can yield a determination regarding which type of projectile to project or which size of projectile to project. For example, two different net sizes and configurations can be deployed on a flying vehicle 200. The system may run one model or two independent models which take into account the different net characteristics, and thus the differences in how the two nets will deploy and expand, and travel through the air. Having different net configurations would yield different probabilities of whether each independent net would capture the target device(s) 216/217. The computer model can take into account a potential danger associated with the target device(s) 216/217 and make a determination regarding which projectile to project first. For example, the system may determine to deploy the net having a larger diameter which will have a greater probability of capturing the target device 216. Other considerations such as the geographic location may be taken into account. For example, if the target device 216 is a danger, and yet not over a populated area, the system may determine that rather than deploying the net, that a series of pellets or streamers would be projected to interrupt the propeller system of the target device 216 and cause it to fall.

Again, the system may determine information about the type or indication of the target device 216 and include in the algorithm data regarding a geographic area that is to be defended. The algorithm can take into account these various factors and make a triggering decision not only on a timing of when to trigger a projectile at the target device 216, but also optionally a type of projectile or a size of projectile to project. An algorithm can be implemented as part of the modeling to determine the physical navigational and speed capabilities of the target device(s) 216/217, whether it is a bad actor, and whether it is likely to be directed to an area or geographic space to be defended.

In one aspect, where multiple projectiles are configured on the flying vehicle 200, a spare projectile can be included as a backup. In one scenario, the computer model will include in its evaluation the fact that a primary projectile and a backup projectile are available on the device. The thresholds that can be established for determining when to fire a projectile can therefore be taken into account, and adjusted based on the fact that a backup projectile exists. For example, if only a single projectile is available on the device 200, the system may have a higher threshold or require a higher probability of successful engagement prior to triggering the firing of the projectile. However, if a backup projectile exists, then a lower threshold of probability of success can be established before firing the first projectile. Adjustments can be made for the different capabilities of a primary projectile and a secondary projectile with respect to their respective models for triggering their deployment.

In one aspect, the projectile module 210 includes two projectiles, like two nets. The system can implement different thresholds for different projectiles 210/222 having different sizes or other characteristics. The system may select which projectile to shoot. For example, one projectile may have a bigger profile or smaller profile, based on all the factors. In one case, a target drone 216 may have an identification that enables the system to know its capabilities for navigation. That knowledge can indicate that to take down the drone 216 will require a larger sized net to capture in case it moves or tries to evade. The system can also run two models each for a different projectile. In one example, a control module 204, 722, 1134 can include an algorithm that receives data regarding characteristics of the target device 216 and makes a decision regarding which projectile module 210/222 to operate to capture the target device 216. One projectile can be pellets and the other can be a net and the model(s) determines which type of projectile to deploy and when.

Figure 11:
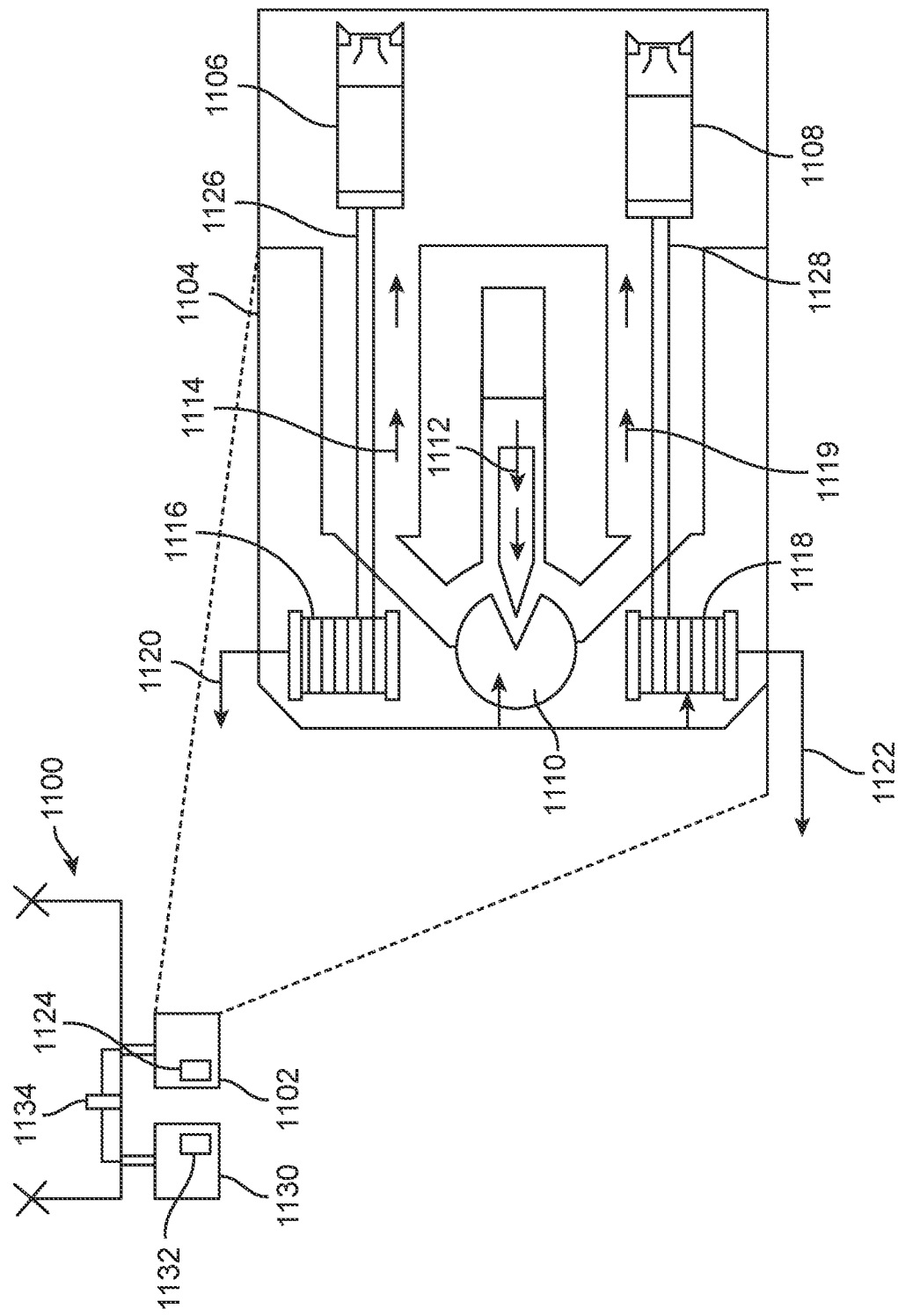
FIG. 11 illustrates a taser embodiment.

FIG. 11 illustrates a taser embodiment 1100. In this aspect, a system 1100 includes flying object, such as a drone having an attached component 1102, which includes taser components for shooting projectiles at a target device. The attached component can be controlled by a control module 1134. In this scenario, the weights 1106, 1108 are attached to conducting wires 1126, 1128. Spools 1116, 1118 are used, to unwind or deploy the wires in a manner that they will deploy cleanly. The connecting wires are attached. 1120, 1122 to an electrical circuit 1124. When the system indicates or triggers the taser, a compressed gas cartridge 1110 can be broken or open 1112 such that the expanding gas can build pressure behind the weights 1106, 1108 launching them through the air. The weights 1106, 108 can be fixed with small barbs so that they can grab onto the target device. The weights in this scenario, act as electrodes attached to the target device. With the electrodes 1106, 10108 attached to the target device, the current travels from the circuit 1124 down the wires 1126, 1128 into the target object stunning or disabling it.

Control module 1134 can also include a flight system used to control the flight, rotary blades, wings, propeller, or any other flight enabling technology associated with the flying vehicle 1100.

Just as the head cartridge 302 as described above, a replaceable taser cartridge could also be provided as well. A configuration could also include a net head cartridge 302, as well as a taser cartridge 1102 in the same overall system. The system could then include a determination algorithm regarding whether to fire and net or to fire a taser at a target object.

FIG. 11 further illustrates another attached component 1130 with a circuit 1132 in communication with a control module 1134 and which can have similar or different characteristics from the attached component 1102.

Figure 12:
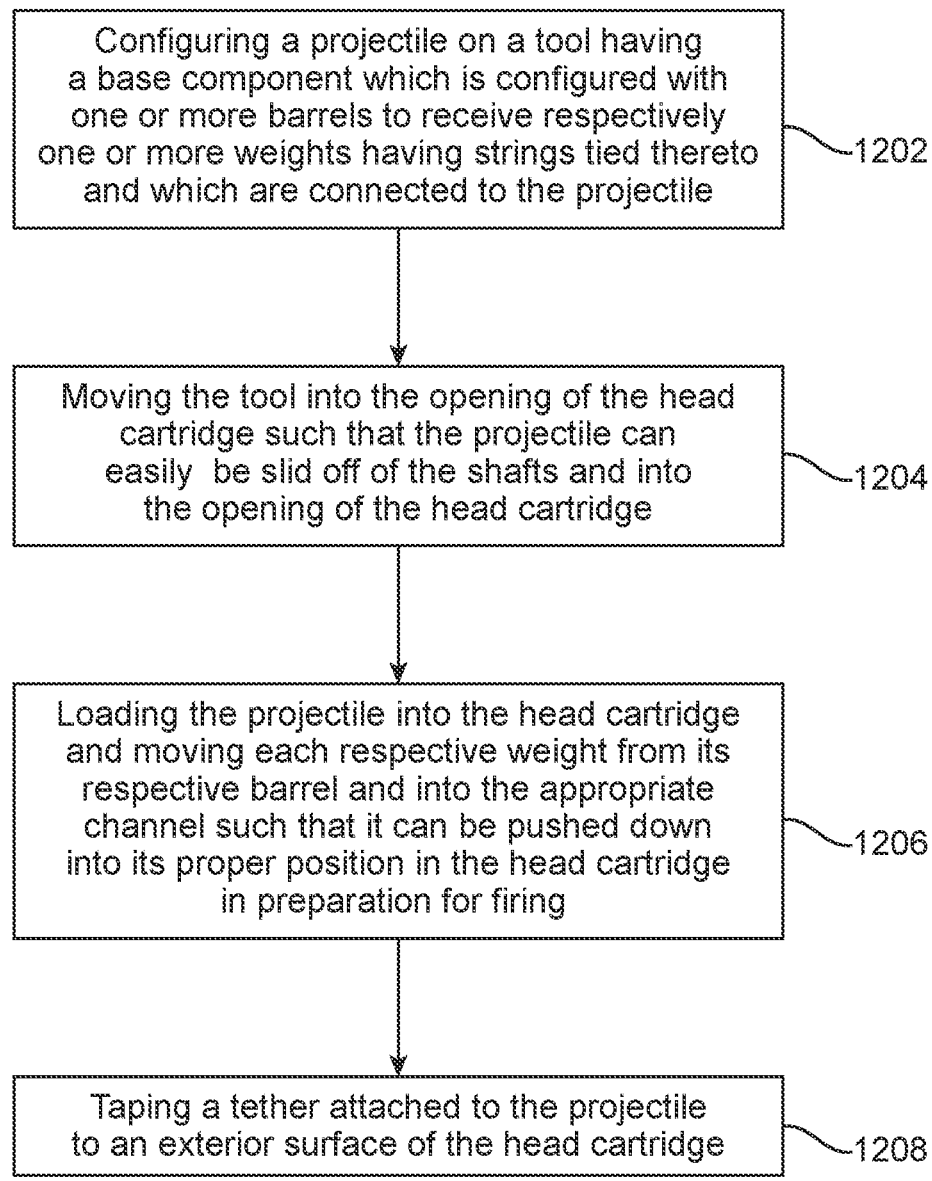
FIG. 12 illustrates another method embodiment.

FIG. 12 illustrates a method embodiment related to packing the head cartridge 302 with the projectile 342 using the tool or jig 600 shown in FIG. 6. The purpose of the tool 600 is to simplify the process of loading the projectile 608/342 into the head cartridge 302. The projectile 608/342, when it is a net, can easily become entangled and difficult to properly configure within the head cartridge 302. The tool 600 enables the user to easily prepare a configuration of the projectile 608/342 for inserting into the head cartridge 302. The method is as follows. A user configures a projectile 608 on a tool having a base component 602 which is configured with one or more barrels 606 arranged to receive respectively one or more weights having strings tied thereto and which are connected to the projectile 608 (1202). The barrels are like cups or openings that are configured to receive the respective weights for holding in a proper position while the user can configure the projectile on one or more shafts 610, 612. With the projectile 608 prepared on the tool 600, the user can then bring the tool 600 into or near the opening 312 of the head cartridge 302 such that the projectile 608 can easily be slid off of the shafts 610, 612 and into the opening of the head cartridge 302 (1204). This process maintains the organized configuration of the projectile 608 as it is loaded into the head cartridge 302. The user can then easily move each respective weight 604 from its respective barrel 606 and into the appropriate channel 314, 340 such that it can be pushed down into its proper position 366, 368 in preparation for firing (1206). Where a tether 343 is attached to the projectile 608, the tether can be prepared utilizing the shafts 610, 612. An end of the tether can have an attachment component tied to it such that it can be taped to an exterior surface of the head cartridge 302 (1208) or at some other location. The method can include any one or more of the steps outlined in FIG. 12. For example, step 1208 is optional in that some projectiles 608 will not have a tether attached thereto and thus that step is optional.

The tool 600 can be used to organize the projectile 608 as well as a tether 343 together. In other words, the projectile 608 configured in an organized fashion on the shafts 610, 612 can also include the tether 343 also configured or organized in connection with the shafts 610, 612 such that the entire package of the projectile and the tether can be easily slid into the opening of the head cartridge 302 in preparation for firing.

Figure 13:
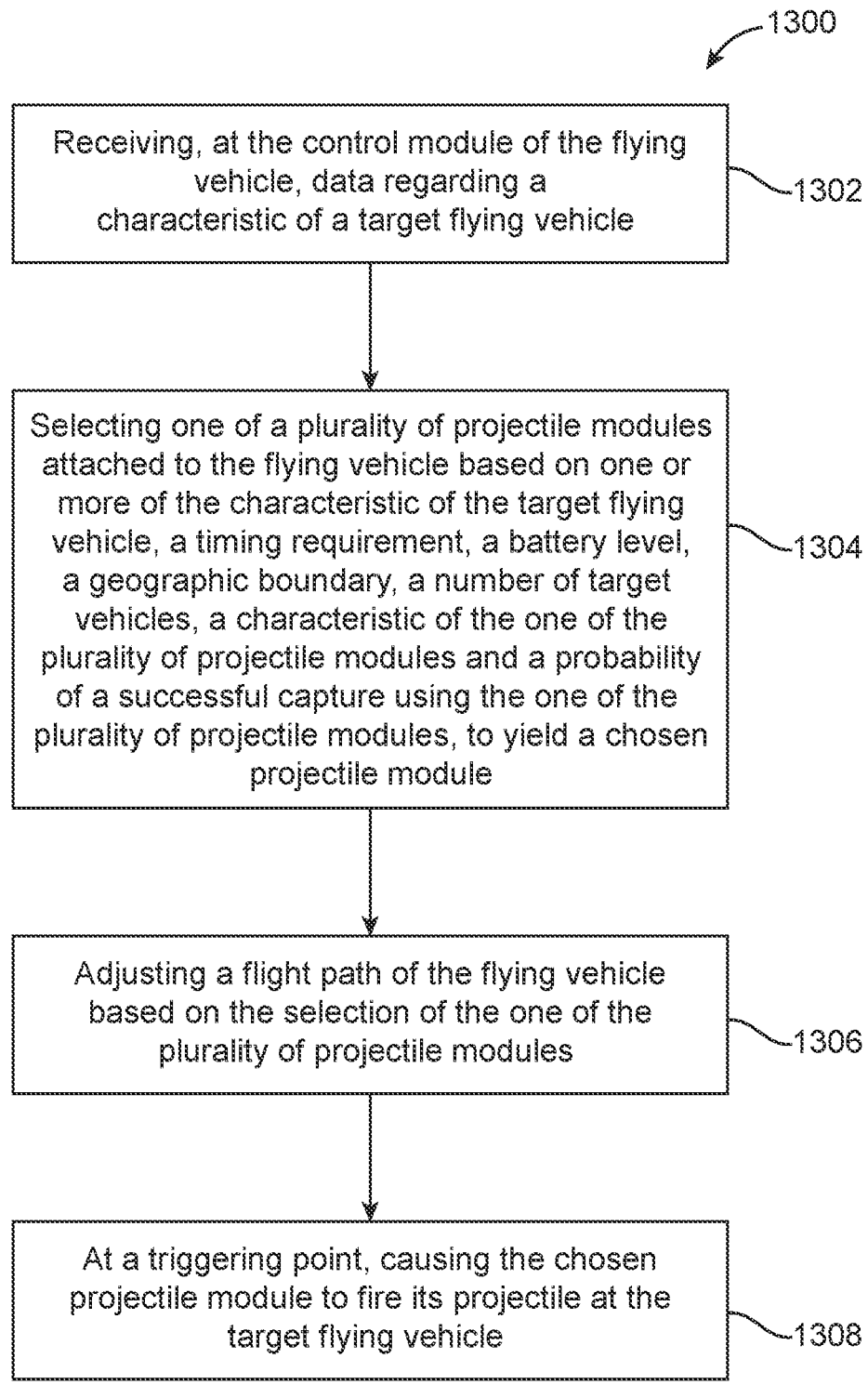
FIG. 13 illustrates a method embodiment.

FIG. 13 illustrates a method 1300 of operating a flying vehicle having a first projectile module 210 and a second projectile module 222. The method includes receiving, at the control module 204 of the flying vehicle 200, data regarding a characteristic of a target flying vehicle 216 (1302) and selecting one of a plurality of projectile modules 210/222 based on one or more of the characteristic of the target flying vehicle 216, a timing requirement, and a probability of a successful capture based on selecting one of the projectile modules (1304). The method can further include adjusting a flight path of the flying vehicle 200 based on the selection of the one of the plurality of projectile modules (1306) and at a triggering point, causing the chosen projectile module 210/222 to fire its projectile at the target flying vehicle 216 (1308). The system can try to maximize (or improve sufficiently) the probability of a successful capture based on the maneuvering of the flying vehicle 200, the characteristics of the chosen projectile, and characteristics of the target device 216, and so forth. The system may have 20 seconds to act or may need to take a shot right now, based on when the target device 216 is over a protected area. Thus, there may be a timing element built into the analysis. The system can take into account such factors to select a projectile module and either fire immediately, or maneuver to a particular location and fire, and so forth. The system can therefore take time into account as well and select a lower probability plan because the target device is about to move over a protected area like a stadium.

An adjustable threshold can be used where the system may wait and follow the target device 216 until there is a 90% probability of success. As the target drone 216 gets closer to a protected area, the threshold may drop to cause the system to select a plan that meets an 80% probability of a successful capture. Thus, the threshold can be dynamic and flexible depending on a number of different factors such as when the flying vehicle 200 needs to act to take down the target vehicle, even at a lower threshold, because the target vehicle is getting close to a dangerous location.

In one aspect, the projectile modules 210/222 can represent, for example, ten different projectile modules and the analysis by the control system 204 can include the fact that there are two attack nets of the type like projectile module 210 that are left of the ten, and one of the defense nets left in projectile module 222. Thus, the analysis can include what different projectiles are still available in the arsenal. This data can further impact the probability of success, for example, knowing that there are two tries left with a particular type of projectile.

In addition, if there are other target devices 217, the system may perform an analysis of multiple target devices 216, 217 and the various probabilities of successfully capturing multiple devices separately and as a group given the arsenal available. For example, if the flying vehicle 200 has four projectiles left of two different types, and the control system 204 may evaluate target device 1 (216) and target device 2 (217) and determine that it could use three projectiles to seek to capture target device 1 (216) and have a 90% probability of success, but then only 30% probability of success using the remaining projectile to capture target device 2 (217). Or, the system may determine that there is a 75% probability of successful capturing both target devices 216/217 by using two projectiles on each of them. Thus, the system may select a plan of attack using its arsenal based on an overall probability of success here multiple target devices are to be captured.

In another example, suppose that to capture a target device 216, using a first projectile module 210, that the flying vehicle 200 would be ready in four seconds to shoot the projectile. However, if the second projectile module 222 is used, then it would take thirty seconds to position the flying vehicle 200 for shooting the projectile. These timing elements can be used in connection with other requirements such as a threshold probability, or a geographic requirement that the target device 216 be captured before it is over a certain object (stadium), at a certain elevation, or any other characteristic. For example, the analysis of the object 216 might be that in twenty seconds it will be at a certain place or height or have a certain orientation, for example, and that it needs to be captured before then. In that case, the first projectile module 210 will be chosen even if the threshold is lower.

In another aspect, the plan for capturing the target device 216 could have multiple stages. For example, the first project module 210 may be used in a first stage and if that is unsuccessful, a second stage can immediately be implemented to use projectile module 222 and make whatever maneuvers necessary to use that module, even if the target device 216 is already in the target area such as over a stadium. Thus, the planned attack can include the probability failure of a first attempt. Two or more stages can be implemented as part of a plan that can take into account a failure of one or more attempts.

An adjustable threshold can be used. For example, the system may require a 90% probability of success while there is time to capture the device 216 before it gets close to the target area like a stadium. However, as it gets closer, the threshold may be lowered such that the attempt is made even if the probability threshold is only 75%, but it is getting close to the stadium so the attempt must be made. All of these scenarios can also apply where there are two or more target devices 216, 217 and where the analysis combines probabilities for each one relative to the arsenal.

In another aspect, the arsenal may include other items instead of projectiles. For example, the projectile module 210 might represent an electromagnetic signal jammer that jams any communication of the target device 216. In that case, the flying vehicle 200 only needs to get close enough to the target device 216 to jam its communication. Therefore, the attack plan may include an analysis of a probability of success of fulfilling such a mission, which does not require any projectile at all but just requires a proximity for sending a jamming signal. Other plans or strategies could relate to an audio signal, the use of a gun with bullets, the use of a laser, the distribution of a smokescreen, and so forth. Any number of different kinds of weapons in the arsenal can be presented by the projectile modules 210, 222.

In some embodiments, the computer-readable storage devices, mediums, and or memories can include a cable or wireless signal containing a bit stream and the like. However, when mentioned, non-transitory computer-readable storage media expressly exclude media such as energy, carrier signals, electromagnetic waves, and signals per se. Thus, a multi-vector attack plan approach could include varying types of assets such an RF jammer, a radar jammer, movement, noise, light, a laser, a net projectile, flame thrower, and so forth. In this case, an analysis can include the probability of success of using the respective asset type, a timing component, a probability requirement which can be static or dynamic, and ultimately calculate and determine an attack plan and carry it out.

In a defensive mode, the system can search through the arsenal for the weapon system that is most appropriate given the data for a defensive action such as deploying a large but slow net. In an attack mode, the system may search through the weapon system for what is most appropriate for a quick and successful attach. The flyer vehicle 200 can be in one of a number of different modes beyond a defense mode and an attack mode. One mode might be a mode of just scaring off a target device 216 or might be to jam its communications. A multi-vector attack plan could cover different modes as well, such as a defensive mode for a first target device 216, and an attack mode for the second target device 217.

In another aspect, the attack plan can take into account other data such as battery power, how much time is left, and the availability of data from ground sensors. For example, there might be ground sensors that can provide data for another twenty seconds after which the target device 216 is out of the range of the ground sensors. In that case, the probability of a successful mission can rely upon the better data that is available from the ground sensors after which the probability of success goes down because on-board sensors will provide data which may not be as reliable. Thus, the attack plan can take into account one or more of batter power (which can also give a limited time availability) and the availability of data about the target device 216 from other devices such as ground sensors.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media conveying such instructions, computing resources for executing them, and other structures for supporting such computing resources are means for providing the functions described in these disclosures.

Although a variety of examples and other information were used to explain aspects within the scope of the appended claims, no limitation of the claims should be implied based on particular features or arrangements in such examples, as one of ordinary skill would be able to use these examples to derive a wide variety of implementations. Further, although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment," "variation," "aspect," "example," "configuration," "implementation," "case," and any other terms which may connote an embodiment, as used herein to describe specific features of configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other in any combination.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates the one member of the set or multiple members of the set satisfy the claim. For example, claim language reciting "at least one of A, B, and C" or "at least one of A, B, or C" means A alone, B alone, C alone, A and B together, A and C together, B and C together, or A, B, and C together.

We claim:

1. A flying vehicle comprising:
   a control system;
   a flight system in communication with the control system for enabling the flying vehicle to fly;
   a first projectile system in communication with the control system; and
   a second projectile system in communication with the control system, wherein the control system determines, based on a characteristic of a target flying vehicle, whether to implement a first mode utilizing the first projectile system to interact with the target flying vehicle or a second mode utilizing the second projectile system to interact with the target flying vehicle, wherein the characteristic of the target flying vehicle comprises one or more of a speed of the target flying vehicle, a relative speed of the target flying vehicle to the flying vehicle, a direction of the target flying vehicle, a target flying vehicle classification, a size of the target flying vehicle, a target vehicle flying system, a physical characteristic of the target flying vehicle, how quickly the flying vehicle needs to act, a geographic projected area, a timing on when a shot needs to be taken, how the target flying vehicle is maneuvering, and an expected path of the target flying vehicle.

2. The flying vehicle of claim 1, wherein the first projectile system and the second projectile system comprise one or more of a net, an electromagnetic signal, a radio frequency signal, a jamming device, a laser, a bullet, and/or a physical projectile.

3. The flying vehicle of claim 1, wherein the first projectile system comprises a first net having a first configuration and the second projectile system comprises a second net having a second configuration.

4. The flying vehicle of claim 3, wherein the first configuration differs from the second configuration.

5. The flying vehicle of claim 3, wherein the first configuration has first projectile area that is smaller than a second projectile area of the second configuration.

6. The flying vehicle of claim 1, wherein the first mode utilizing the first projectile system further comprises a first route to be taken by the flying vehicle in attempting to interact with the target flying vehicle and wherein the second mode utilizing the second projectile system further comprises a second route to be taken by the flying vehicle in attempting to interact with the target flying vehicle.

7. The flying vehicle of claim 1, wherein the first route comprises following the target flying vehicle and wherein the second route comprises moving into a position ahead of the target flying vehicle.

8. The flying vehicle of claim 1, wherein the control system further determines, based on one or more of a time period, a geographic boundary relative to the target flying vehicle, an availability of sensor data from sensors not on the flying vehicle, a battery level, a sensor coverage area relative to the target flying vehicle and characteristics of the first projectile system and the second projectile system, whether to implement the first mode utilizing the first projectile system or the second mode utilizing the second projectile system to interact with the target flying vehicle.

9. The flying vehicle of claim 1, further comprising:
at least a third projectile system in communication with the control system, wherein the control system determines, based on one or more of a characteristic of the target flying vehicle and data about an available arsenal on the flying vehicle, whether to implement the first mode utilizing the first projectile system, the second mode utilizing the second projectile system, or a third mode utilizing the third projectile system, to interact with the target flying vehicle.

10. The flying vehicle of claim 1, wherein the first projectile system and the second projectile system are each removably attachable to the flying vehicle in a respective first projectile system receiving port and a second projectile system receiving port.

11. A flying vehicle comprising:
a control system; and
a plurality of different projectile systems each removably attached to a respective receiving port of a plurality of projectile system receiving ports, wherein the control system selects, based on one or more of a characteristic of a target flying vehicle and an available arsenal of the plurality of different projectile systems, a selected projectile system from the plurality of different projectile systems to use to interact with the target flying vehicle, wherein the planned route is chosen based in part on respective characteristics of the chosen projectile system.

12. The flying vehicle of claim 11, wherein the control system further selects a pursuit path strategy for the flying vehicle to use the selected projectile system to interact with the target flying vehicle.

13. The flying vehicle of claim 11, wherein the control system identifies a respective probability of a successful interact with of the target flying vehicle taking into account alternate characteristics of the different projectile systems.

14. The flying vehicle of claim 11, wherein the control system further selects, based on one or more of the characteristic of the target flying vehicle, a probability of a successful interaction depending on the plurality of different projectile systems, a battery level, an availability of sensor data from sensors not on the flying vehicle, a geographic boundary, a timing component and respective characteristics of each of the plurality of different projectile systems, a planned route for the flying vehicle to follow to interact with the target flying vehicle using a chosen projectile system.

15. A drone comprising:
a control system;
a flight system in communication with the control system for enabling the drone to fly;
a first projectile system in communication with the control system; and
a second projectile system in communication with the control system, wherein the control system determines, based on a characteristic of a target drone and one or more of a time frame, a geographic parameter associated with a path of the target drone, an RF coverage area associated with the path of the target drone, a battery level, an availability of sensor data from sensors not on the drone, a timing requirement and a probability of a successful interaction with the target drone, whether to implement a first mode associated with a first planned path of the drone to utilize the first projectile system or a second mode associated with a second planned path of the drone to utilize the second projectile system to yield a chosen mode, wherein the drone implements the chosen mode to interact with the target drone.

16. The drone of claim 15, wherein the first projectile system comprises a removable first projectile cartridge that attaches to a fixed first projectile cartridge receiving port and wherein the second projectile system comprises a removable second projectile cartridge that attaches to a fixed second projectile cartridge receiving port.

17. The drone of claim 15, wherein the control system receives data from one of another drone or a ground based tracking system to determine the chosen mode.

18. A method comprising:
receiving, at a control module of a flying vehicle, data regarding a characteristic of a target flying vehicle;
selecting one of a plurality of projectile modules attached to the flying vehicle based on one or more of the characteristic of the target flying vehicle, a timing requirement, a battery level, a geographic boundary, a number of target vehicles, a characteristic of the one of the plurality of projectile modules and a probability of a successful interaction using the one of the plurality of projectile modules, to yield a chosen projectile module; and
causing the chosen projectile module to fire its projectile at the target flying vehicle.

19. The method of claim 18, further comprising:
prior to causing the chosen projectile module to fire its projectile, adjusting a flight path of the flying vehicle based on the chosen projectile module.

20. The method of claim 18, further comprising determining a probability of the successful interaction based on the chosen projectile module.

21. The method of claim 18, further comprising:
determining a probability of the successful interaction with one or more target flying vehicles utilizing the plurality of projectile modules.

22. The method of claim 21, wherein a plurality of target flying vehicles are being pursued by the flying vehicle, the method further comprising:
based on the probability of the successful interaction with the plurality of target flying vehicles, implementing a plan to maneuver and utilize a respective projectile module of the plurality of projectile modules for each target flying vehicle of the plurality of target flying vehicles.

* * * * *